(12) United States Patent
Sanma et al.

(10) Patent No.: US 8,532,879 B2
(45) Date of Patent: Sep. 10, 2013

(54) INFORMATION PROVIDING DEVICE FOR VEHICLE

(75) Inventors: Norio Sanma, Okazaki (JP); Shouji Osaki, Okazaki (JP); Syuichi Kouno, Okazaki (JP); Keiji Kawamura, Kariya (JP); Sei Iguchi, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 217 days.

(21) Appl. No.: 13/207,663

(22) Filed: Aug. 11, 2011

(65) Prior Publication Data
US 2012/0046833 A1 Feb. 23, 2012

(30) Foreign Application Priority Data

Aug. 18, 2010 (JP) .................................. 2010-183248
Dec. 8, 2010 (JP) .................................. 2010-273969

(51) Int. Cl.
*A01B 69/00* (2006.01)
(52) U.S. Cl.
USPC ................................ 701/41; 180/204; 180/6.2
(58) Field of Classification Search
USPC ..................... 701/41, 70, 301; 180/248, 197, 180/422, 204, 6.2
See application file for complete search history.

(56) References Cited

U.S. PATENT DOCUMENTS

| 4,503,504 A | * | 3/1985 | Suzumura et al. ............... 701/49 |
| 5,230,665 A | | 7/1993 | Tanaka et al. |
| 5,854,987 A | * | 12/1998 | Sekine et al. ..................... 701/41 |
| 5,913,375 A | * | 6/1999 | Nishikawa ..................... 180/168 |
| 6,984,059 B2 | * | 1/2006 | Ishiguro et al. ............... 362/465 |
| 2008/0174415 A1 | | 7/2008 | Tanida et al. |

FOREIGN PATENT DOCUMENTS

| JP | U-59-180928 | 12/1984 |
| JP | A-11-146578 | 5/1999 |
| JP | A-2003-300468 | 10/2003 |
| JP | A-2006-199094 | 8/2006 |
| JP | A-2008-162466 | 7/2008 |
| JP | A-2009-001094 | 1/2009 |

OTHER PUBLICATIONS

Examination Report in the corresponding JP patent application No. 2010-273969 dated Sep. 24, 2012 and mailed on Oct. 2, 2012.

* cited by examiner

*Primary Examiner* — Gertrude Arthur Jeanglaude
(74) *Attorney, Agent, or Firm* — Posz Law Group, PLC

(57) ABSTRACT

An information providing device includes: a vehicle condition detector for detecting a vehicle condition; a support information generating element for generating support information for a driver; and a tactile sensibility notification element in a steering wheel for notifying the support information to the driver. The steering wheel includes a wheel element having a base, a movable portion and a driving unit. The movable portion is relatively movable with respect to the base. The driving unit drives the movable portion according to the support information. The movable portion and the driving unit provide the tactile sensibility notification element. Movement of the movable portion provides notification of the support information.

18 Claims, 17 Drawing Sheets

INFORMATION PROVIDING DEVICE FOR VEHICLE

CROSS REFERENCE TO RELATED APPLICATIONS

This application is based on Japanese Patent Applications No. 2010-183248 filed on Aug. 18, 2010, and No. 2010-273969 filed on Dec. 8, 2010, the disclosures of which are incorporated herein by reference.

TECHNICAL FIELD

The present invention relates to an information providing device for providing information for supporting a drive of a vehicle. The device transmits the information to a driver of the vehicle via a steering wheel.

BACKGROUND

An information providing device is described in JP-A-2008-162466 and JP-A-2008-149844 corresponding to US 2008/0174415. In JP-A-2008-162466, it is an object to provide a steering wheel for warning a driver of a vehicle accurately by vibrating a holding portion with using a vibrator. The driver holds the holding portion of the steering wheel with a middle finger when the driver operates the steering wheel.

Thus, the steering wheel includes the vibrator for vibrating the holding portion. The vibrator generates vibration in a range between 50 Hz and 300 Hz so that the holding portion is vibrated and the vibration is perceived by the skin of the driver.

In JP-A-2008-149844, it is an object to provide a warning apparatus of the vehicle for surely informing the driver of the warning information relating to the vehicle conditions and for easily transmitting the information to the driver. Thus, the vehicle condition sensor detects the vehicle conditions, and based on the vehicle condition information, the warning display generates the warning information. Further, the vehicle condition information transmission device transmits the vehicle condition information to the driver based on the vehicle condition information.

The vehicle condition information transmission device includes a haptic information providing element for transmitting the information about the change of the vehicle conditions to the driver as haptic information via the steering wheel, which is operated by the driver. When the warning display generates the warning information, the haptic information providing element functions.

Specifically, a palm of the driver is irritated by protrusions arranged in a matrix manner so that the information is perceived with the skin of the driver. The frequency, the stroke and the operation pattern of the protrusions are adjustable. For example, the device warns the driver of a fact that the driver forgets to release a parking brake or information about a zig-zag driving.

Haptic sense of a palm of the driver, which holds the steering wheel, includes two types. One is skin sensibility, which is detected by a receptor organ on the surface of the skin, and the receptor organ is irritated so that the irritation is detected. The other is tactile sensibility, which is detected by muscle and/or bone, and a force is applied to the muscle and the bone so that the force is detected. The above devices are information providing devices with using the skin sensibility.

For example, the skin sensibility of each driver is different since the skin sensibility is varied in individual person, the skin of the driver may be injured, and/or the driver may wear a globe. Thus, the perception of each driver is varied. Accordingly, although the irritation representing support information transmitted from the information providing device is the same, different driver may interpret the irritation in a different way. Thus, the interpretation of the irritation may be varied. Accordingly, it is required for the information providing device to utilize not only the irritation of the skin sensibility detected by the receptor organ on the surface of the skin but also the force of the tactile sensibility detected by the muscle and the bone.

SUMMARY

In view of the above-described problem, it is an object of the present disclosure to provide an information providing device for providing information for supporting a drive of a vehicle. The information providing device accurately transmits support information to the driver so that the driver interprets the information accurately even when the sensibility of each driver is varied.

According to an example aspect of the present disclosure, an information providing device for a vehicle includes: a vehicle condition detector for detecting a vehicle condition based on information from an in-vehicle sensor; a support information generating element for generating support information, which provides to support a driver of the vehicle, based on the vehicle condition; and a tactile sensibility notification element for notifying the support information to the driver. The tactile sensibility notification element is arranged in a steering wheel of the vehicle. The steering wheel includes a wheel element, which is gripped by the driver. The wheel element includes a base, a movable portion and at least a part of a driving unit. The movable portion is relatively movable with respect to the base. The driving unit drives the movable portion according to the support information. The movable portion and the driving unit provide the tactile sensibility notification element. Movement of the movable portion provides notification of the support information.

In the above device, since the movement of the movable portion provides the notification of the support information, muscle and bone of a hand of the driver is irritated so that tactile sensibility is irritated. Thus, the support information is accurately transmitted to the driver, and therefore, the driver interprets the information accurately even when the sensibility of each driver is varied.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
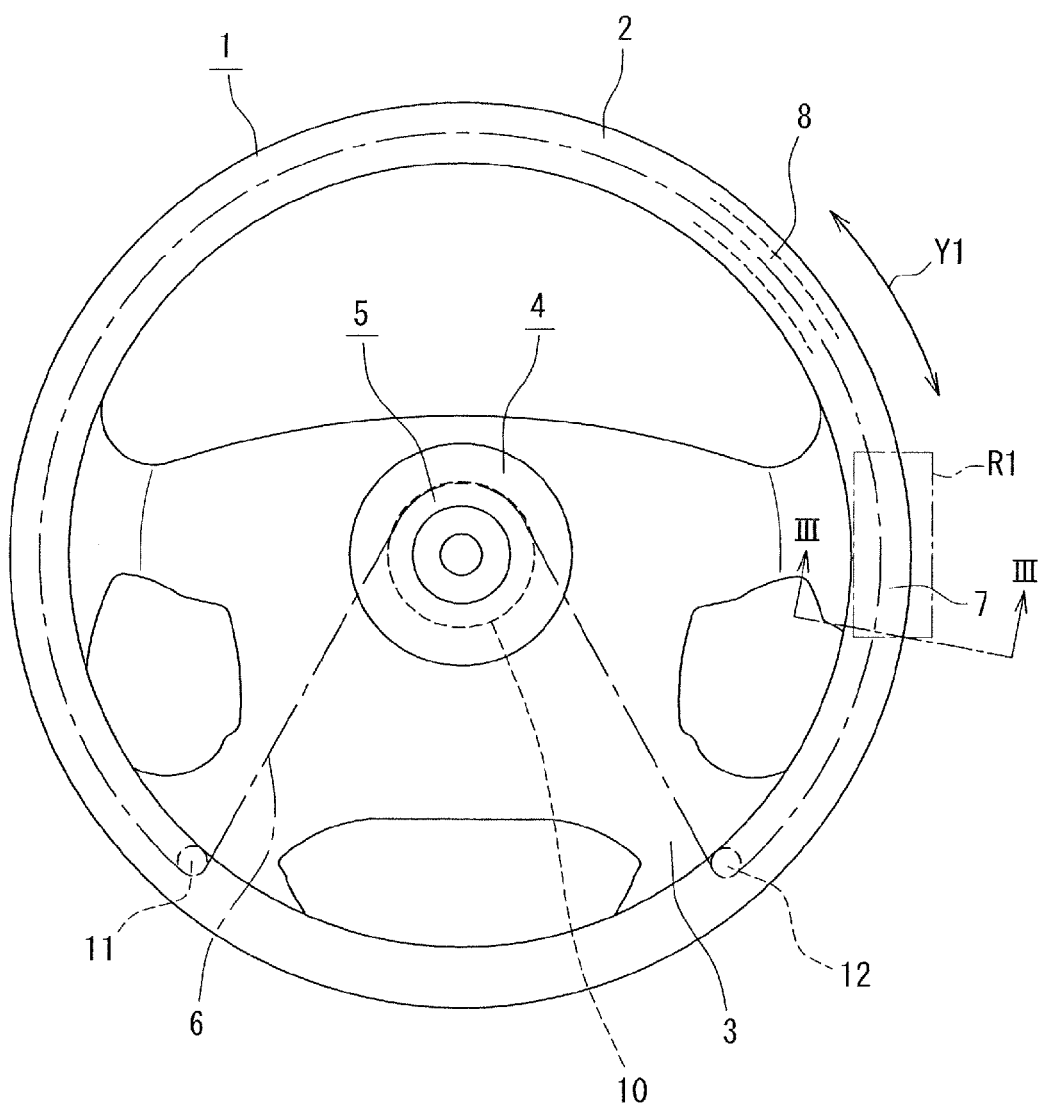
FIG. 1 is a diagram showing a front view of a steering wheel together with an information providing device according to a first embodiment.
Figure 2:
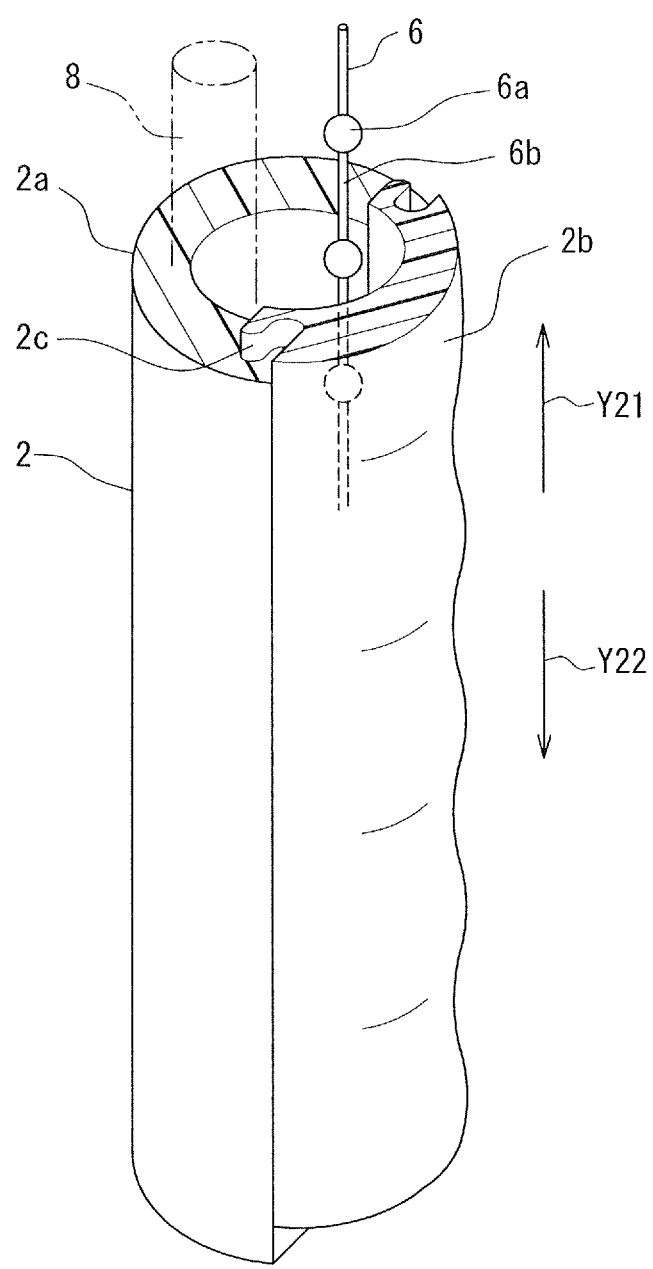
FIG. 2 is a diagram showing a part of the steering wheel, which is gripped by a hand of a driver.

An information providing device according to a first embodiment will be explained with reference to FIGS. 1 to 8B. FIG. 1 shows a steering wheel together with the information providing device. FIG. 2 shows an outer exterior portion of a part R1 of a wheel element 2 of the steering wheel. The part R1 of the wheel element 2 is held by a hand of the driver.

The steering wheel 1 in FIG. 1 includes the wheel element 2, four spoke elements 3 and a boss element 4. The driver holds an outer portion of the wheel element 2 with hands. Each spoke element 3 is connected to the wheel element 2 and the boss element 4. The boss element 4 as a base of the steering wheel 1 is attached at a center of the spoke elements 3.

In the first embodiment, a rotation driver 5 is mounted in the boss element 4. The rotation driver 5 includes a driving motor therein. The driving motor displaces a part of the outer exterior portion of the wheel element 2 in a circumferential direction Y1. A belt 6 as a ball chain for forming a part of the driver 5 is mounted in the steering wheel 1. The belt 6 is displaced in the wheel element 2 by the driving motor in the circumferential direction Y1.

In the steering wheel 1 of FIG. 1, a part R1 surrounded with a dashed-dotted line is a part of the holding portion 7, which is usually held by a hand of the driver. The holding portion 7 provided by a part of the outer exterior portion of the wheel element 2 is displaceable in the circumferential direction with respect to the other part of the outer exterior portion.

In FIG. 2, the part of the outer exterior portion of the wheel element 2 is defined as a backside outer exterior portion 2b, and the other part of the outer exterior portion of the wheel element 2 is defined as a front side outer exterior portion 2a. The backside outer exterior portion 2b is engaged with the front side outer exterior portion 2a through an engagement portion 2c having a concavity and a convexity. The backside outer exterior portion 2b is movable with respect to the front side outer exterior portion 2a in the circumferential direction Y21, Y22 in FIG. 2, which is along with the outer circumference of the wheel element 2. Thus, the backside outer exterior portion 2b provides a movable portion of the tactile sensibility notification element.

The backside outer exterior portion 2b and the front side outer exterior portion 2a are mutually movable with each other in the direction Y21, Y22. In order to engage the backside outer exterior portion 2b and the front side outer exterior portion 2a, i.e., in order not to be separated from each other, the convexity of one of the backside outer exterior portion 2b and the front side outer exterior portion 2a engages the concavity of the other one of the backside outer exterior portion 2b and the front side outer exterior portion 2a.

The outer exterior portion including the backside outer exterior portion 2b and the front side outer exterior portion 2a is made of urethane resin or polypropylene. The tactile sensibility notification element is arranged in at least a predetermined region of the wheel element 1 in the steering wheel 1, which is held or gripped by the hand of the driver when the vehicle runs straight. Specifically, the predetermined region of the wheel element 1 is, for example, in a range between eight o'clock direction and ten o'clock direction and in a range between two o'clock direction and four o'clock direction.

A wheel element core bar 8 is arranged in the wheel element 2. The wheel element core bar 8 provides a core bar. The core bar 8 includes a metallic cylinder shaft made of steel or magnesium alloy. In FIG. 2, the metallic cylinder shaft is shown as a straight shaft. Practically, the metallic cylinder shaft has a ring shape.

The wheel element core bar 8 and the front side outer exterior portion 2a are rotatable integrally when the driver turns the steering wheel. The rotation of the wheel element core bar 8 and the front side outer exterior portion 2a is transmitted to the boss element 4 via the spoke elements 3. Further, the rotation of the wheel element core bar 8 and the front side outer exterior portion 2a is transmitted from the boss element 4 to a steering shaft (not shown). The steering shaft is an shaft connecting between the steering wheel 1 and a steering gear box, and defined as a column shaft.

The front side outer exterior portion 2a is integrated with the wheel element core bar 8. The reason why the front side outer exterior portion 2a is integrated with the wheel element core bar 8 is such that it is necessary to transmit the rotation force in a case where the driver turns the steering wheel 1 and load for maintaining a current state of the steering wheel 1 from the front side outer exterior portion 2a to the steering shaft via the wheel element core bar 8, the spoke elements 3, and the boss element 4.

The rotation of the front side outer exterior portion 2a in the direction Y21, Y22 directly affects handling performance of the vehicle. The rotation displacement of the backside outer exterior portion 2b in the direction Y21, Y22 with respect to the front side outer exterior portion 2a does not directly affect handling performance of the vehicle. Although the backside outer exterior portion 2b is coupled with the front side outer exterior portion 2a via the engagement portion 2c, the rotation displacement of the backside outer exterior portion 2b provides a function for transmitting the support information to the driver. The rotation displacement of the backside outer exterior portion 2b is generated by displacing the backside outer exterior portion 2b in the circumferential direction Y21, Y22 of the wheel element 2 according to the support information.

The backside outer exterior portion 2b for generating the rotation displacement includes a corrugated surface having multiple bumps. Thus, the driver can easily grip the wheel element 2 of the steering wheel 1. The rotation displacement of the backside outer exterior portion 2b with respect to the front side outer exterior portion 2a is movement completed in the steering wheel 1. Thus, the rotation displacement is not directly transmitted as the driving force to the steering shaft.

When the driver holds the front side outer exterior portion 2a and the backside outer exterior portion 2b of the wheel element 2, and the rotation displacement of the backside outer exterior portion 2b in the circumferential direction Y21, Y22 with respect to the front side outer exterior portion 2a occurs, the rotation displacement is conducted from the steering wheel 1 to a palm or a finger of the driver.

In this case, not only the skin sensibility but also the tactile sensibility are irritated so that the information providing device prompts the driver to turn the steering wheel in the rotation displacement direction. Specifically, the rotation displacement irritates the receptor organ on the surface of the skin, and further irritates the tactile sensibility so that a force is applied to the muscle and the bone. Thus, as described later, the information providing device prompts the driver to turn the steering wheel 1 so that the running position of the vehicle, which is deviated from a proper lane of the road, is returned to the proper lane. Thus, the information providing device notifies the driving support information.

Next, a mechanism for generating the rotation displacement will be explained as follows. In FIG. 1, a stepping motor (not shown) as a driving power generator is arranged in the boss element 4. The stepping motor drives to rotate a sun gear having a center hollow portion in a planetary gear system. Further, an outer gear is rotated by the sun gear via a planetary gear around a sun gear. A ball chain sprocket 10 for driving the ball chain 6 is formed on an outer periphery of the outer gear. The ball chain sprocket 10 functions as a rotation body for driving the ball chain 6 as the belt.

The steering shaft penetrates into the hollow portion of the stepping motor and the hollow portion of the planetary gear system. Specifically, the stepping motor and the planetary gear system are arranged in space around the steering shaft.

According to the rotation of the stepping motor, the planetary gear system is rotated. Thus, the sprocket 10 on the output side of the planetary gear system is rotated. The driving mechanism with using the sprocket 10 and the ball chain 6 is disclosed in Japanese Patent No. 3064486 and the like.

The ball chain 6 is available commercially. The ball chain 6 includes multiple locking parts 6a having a ball shape and a wire rope. The locking parts 6a are fixed to the wire rope 6b at predetermined intervals. The sprocket 10 for driving the ball chain 6 includes multiples concavities for latching the locking parts 6a of the ball chain 6. The concavities are arranged on the outer periphery of the sprocket 10. A protrusion having a V-shape groove is formed between two adjacent concavities. The wire rope 6b of the ball chain 6 is mounted in the groove of the protrusion.

In FIG. 1, when the stepping motor drives to rotate a sun gear according to a driving signal from a controller, the sprocket 10 is rotated via the planetary gear system so that the ball chain 6 is displaced. The ball chain 6 is arranged from the inside of the boss element 4 to the inside of the wheel element 2 via the inside of the spoke element 3.

Two fixed pulleys 11, 12 as a roller guides the ball chain 6 so that a part of the ball chain 6 protruding from the wheel element 2 is introduced into the sprocket 10 of the boss element 4 via the inside of the spoke element 3.

Figure 3:
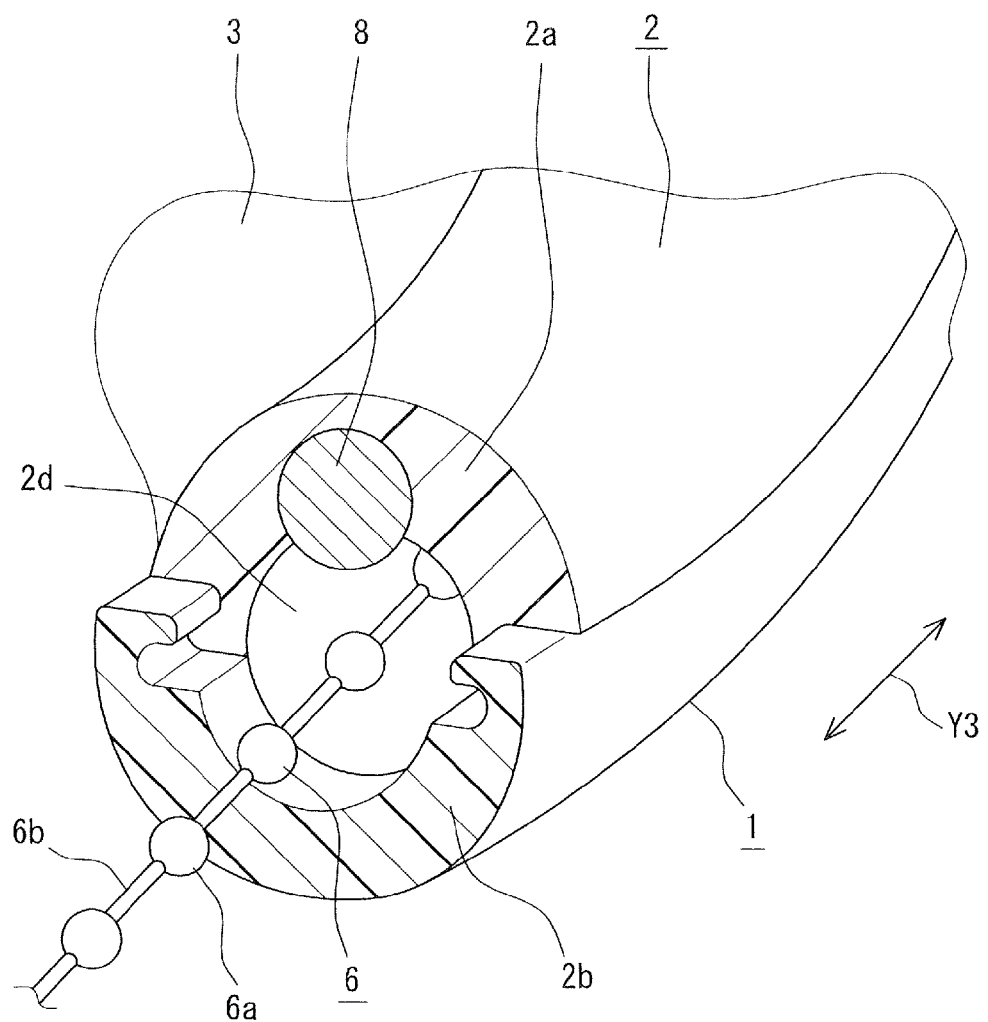
FIG. 3 is a diagram showing a cross sectional view of the part of the steering wheel taken along line III-III in FIG. 1.

FIG. 3 shows a partial cross sectional view of the steering wheel 1 taken long line III-III in FIG. 1. The wheel element core bar 8 provided by the metallic cylinder shaft in the wheel element 2 is partially embedded in the front side outer exterior portion 2a, as shown in FIG. 3. The backside outer exterior portion 2b is slidable with respect to the front side outer exterior portion 2a in a predetermined range in the circumferential direction Y3 of the steering wheel 1.

The ball chain 6 is arranged movably in the hollow portion 2d between the front side outer exterior portion 2a and the backside outer exterior portion 2b. The ball chain 6 is connected to the backside outer exterior portion 2b so that the backside outer exterior portion 2b is slidable with respect to the front side outer exterior portion 2a.

Accordingly, when the sprocket 10 rotates, and the ball chain 6 is displaced in the circumferential direction Y3 in FIG. 3, the backside outer exterior portion 2b slides with respect to the front side outer exterior portion 2a. The slidable backside outer exterior portion 2b is arranged in a range of 300 degrees between the fixed pulleys 11, 12. The slidable backside outer exterior portion 2b of the wheel element 2 is gripped by the driver when the driver drives the vehicle.

Figure 4:
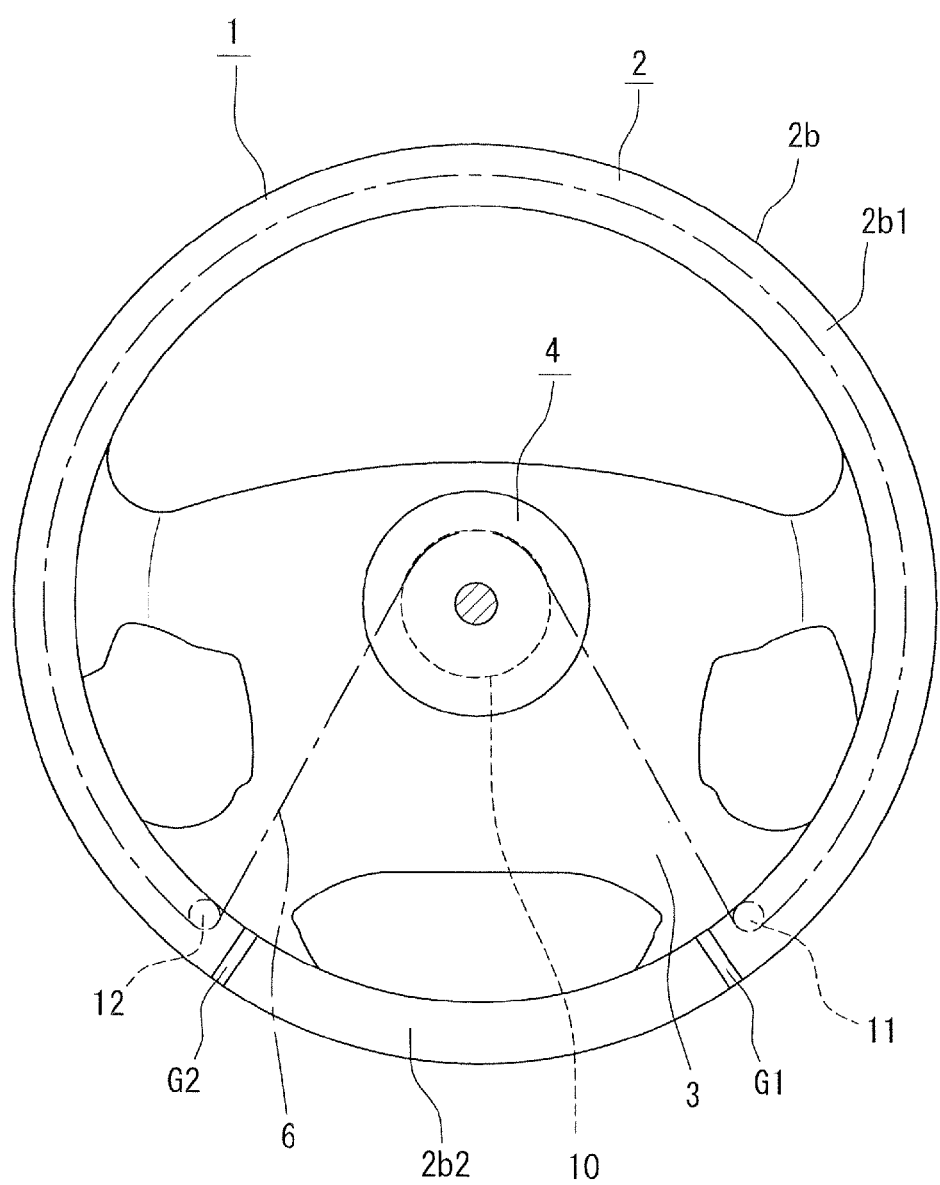
FIG. 4 is a diagram showing a rear view of the steering wheel in FIG. 1.

FIG. 4 shows a backside view of the steering wheel 1. The backside outer exterior portion 2b between the fixed pulleys 11, 12 in a range of 300 degrees is defined as a movable backside outer exterior portion 2b1. The movable backside outer exterior portion 2b1 is slidable with respect to the front side outer exterior portion 2a. The fixed backside outer exterior portion 2b is arranged in a range of 60 degrees between the fixed pulleys 11, 12, and defined as a fixed backside outer exterior portion 2b2. The fixed backside outer exterior portion 2b2 and the front side outer exterior portion 2a are fixed to each other so that the fixed backside outer exterior portion 2b2 is not slidable with respect to the front side outer exterior portion 2a.

Thus, the backside outer exterior portion 2b includes the movable backside outer exterior portion 2b1 and the fixed backside outer exterior portion 2b2. The movable backside outer exterior portion 2b1 as a part of the backside outer exterior portion 2b in a range of 300 degrees is displaced with respect to the front side outer exterior portion 2a, and the fixed backside outer exterior portion 2b2 as the other part of the backside outer exterior portion 2b in a range of 60 degrees is fixed to the front side outer exterior portion 2a.

Two slits G1, G2 are formed between the movable backside outer exterior portion 2b1 and the fixed backside outer exterior portion 2b2. The movable backside outer exterior portion 2b1 is slidable in a range of 300 degrees by a distance of each slit G1, G2 with respect to the fixed backside outer exterior portion 2b2.

Figure 5:
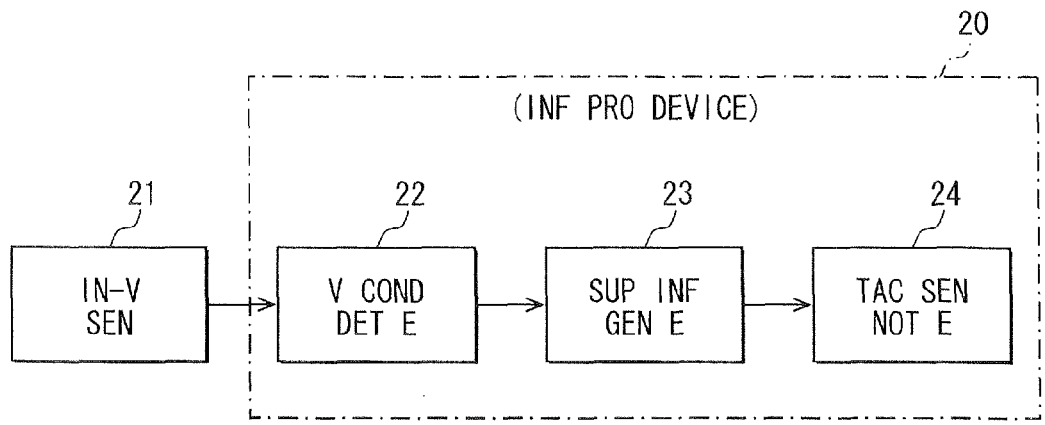
FIG. 5 is a block diagram showing the information providing device according to the first embodiment.
Figure 6:
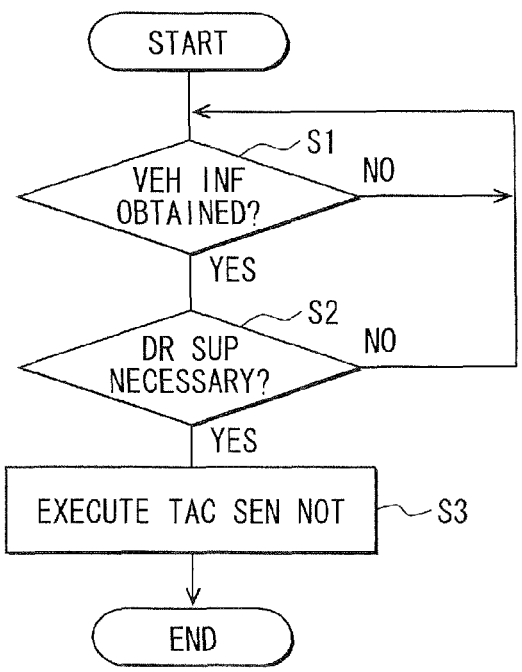
FIG. 6 is a flowchart showing a control process executed by a support information generating element in the information providing device in FIG. 5.
Figure 7A:
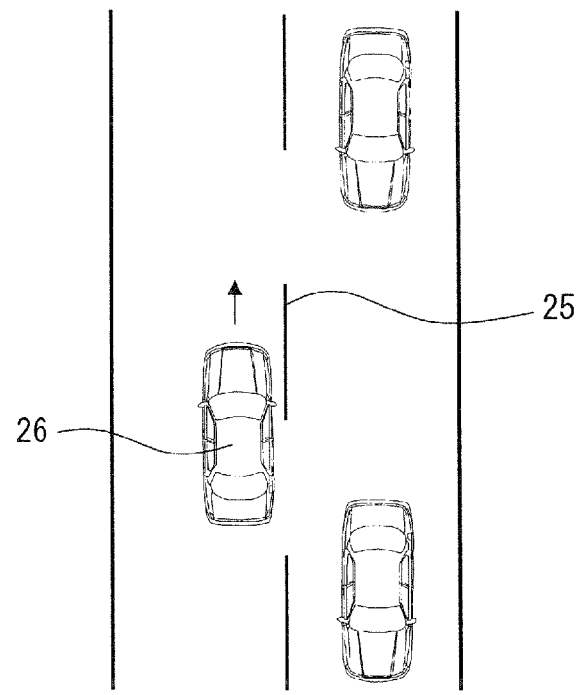
FIG. 7A is a diagram showing the vehicle running near a center line of a road.
Figure 7B:
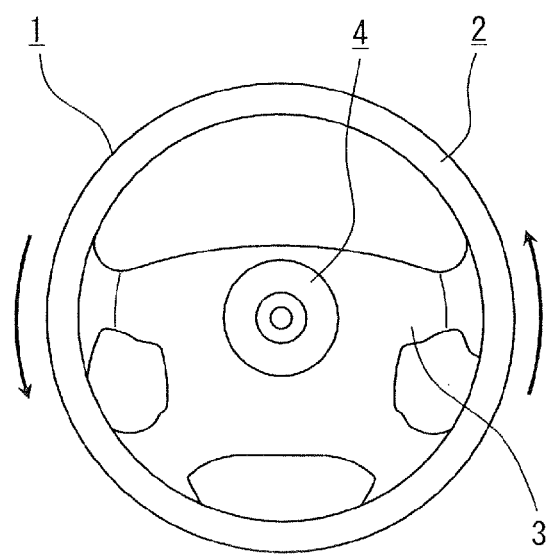
FIG. 7B is a diagram showing tactile sensibility notification for prompting the driver to turn the steering wheel to the left.
Figure 8A:
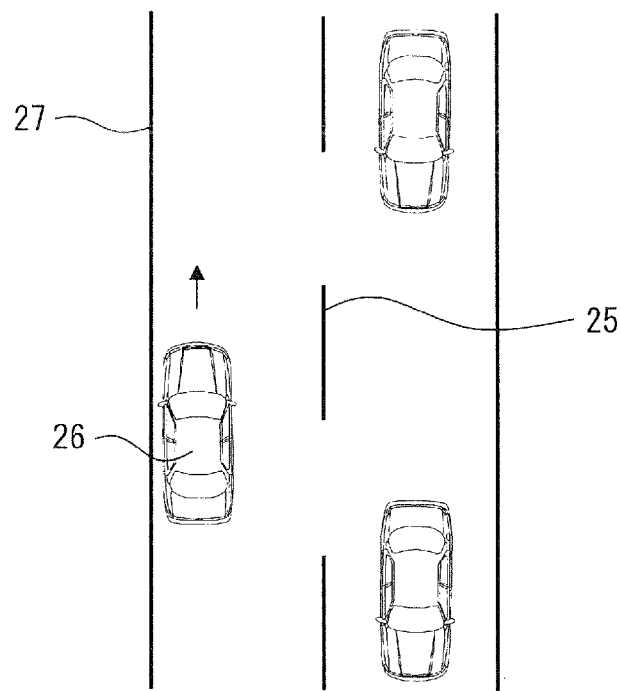
FIG. 8A is a diagram showing the vehicle running near a road shoulder.
Figure 8B:
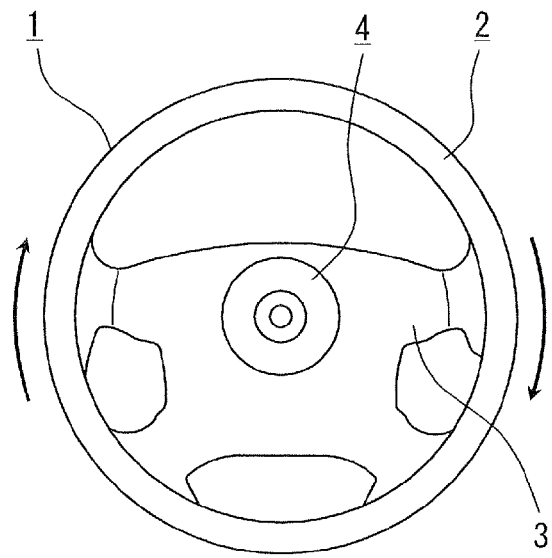
FIG. 8B is a diagram showing tactile sensibility notification for prompting the driver to turn the steering wheel to the right.

FIG. 5 shows a block diagram of the information providing device according to the first embodiment. FIG. 6 is a flowchart of a control process executed by the support information generating element 23. FIG. 7A shows the vehicle running near a center line of a road, and FIG. 7B shows tactile sensibility notification for prompting the driver to turn the steering wheel to the left. FIG. 8A shows the vehicle running near a road shoulder, and FIG. 8B shows tactile sensibility notification for prompting the driver to turn the steering wheel to the right. In FIGS. 7A to 8B, the vehicle is a right-hand steering wheel vehicle so that the vehicle runs on the left side of the road.

When the vehicle is a left-hand steering wheel vehicle so that the vehicle runs on the right side of the road, the right side and the left side in FIGS. 7A to 8B are reversed. Specifically, in FIGS. 7A and 7B, the tactile sensibility notification prompts the driver to turn the steering wheel to the right when the vehicle runs near the center line of the road. Further, in FIGS. 8A and 8B, the tactile sensibility notification prompts the driver to turn the steering wheel to the left when the vehicle runs near the road shoulder.

In FIG. 5, a in-vehicle sensor 21 includes a GPS sensor for detecting a position of the vehicle, a traffic lane sensor for detecting a position of a traffic lane, a road shoulder sensor for detecting a position of a road shoulder, an obstacle sensor for detecting an obstacle disposed on a fronts side or a rear side of the vehicle, and the like. The in vehicle sensor 21 further includes a camera.

The sensor information of the in-vehicle sensor 21 is input into the vehicle condition detecting element 22. The vehicle condition detecting element 22 is, for example, a navigation device, a traffic lane and road shoulder monitor and driving controller, a vehicle front and rear side monitor and the like.

A signal of the vehicle condition detecting element 22 is transmitted to the support information generating element 23. According to a control signal of the support information generating element 23, the stepping motor for driving the sprocket 10 in the tactile sensibility notification element 24 is operated. The tactile sensibility notification element 24 determines according to the control process whether it is necessary to perform the tactile sensibility notification.

In FIG. 6, when the control process starts, in step S1, the support information generating element 23 determines whether the vehicle condition information is obtained. For example, when the vehicle condition detecting element 22 is the traffic lane and road shoulder monitor and driving controller, in step S1, the support information generating element 23 determines whether the information about the traffic lane or the road shoulder is obtained.

FIGS. 7A and 7B shows a case where the tactile sensibility notification element 24 performs the tactile sensibility notification with monitoring a center line 25 by the traffic lane and road shoulder monitor and driving controller as the vehicle condition detecting element 22. FIG. 7A shows the vehicle 26 running near the center line 25 of the road, and FIG. 7B shows the tactile sensibility notification for prompting the driver to turn the steering wheel 1 to the left. The tactile sensibility notification is provided by the rotation displacement of the movable backside outer exterior portion 2b1.

FIGS. 8A and 8B shows a case where the tactile sensibility notification element 24 performs the tactile sensibility notification with monitoring a road shoulder 27 by the traffic lane and road shoulder monitor and driving controller as the vehicle condition detecting element 22. FIG. 8A shows the vehicle 26 running near the road shoulder 27 of the road, and FIG. 8B shows the tactile sensibility notification for prompting the driver to turn the steering wheel 1 to the right. The tactile sensibility notification is provided by the rotation displacement of the movable backside outer exterior portion 2b1.

In step S1 of FIG. 6, when the information about the traffic lane or the road shoulder is obtained, the determination in step S1 is "YES." Then, in step S2, the support information generating element 23 determines whether it is necessary to execute the driving support. In this case, for example, when the vehicle 26 runs at a position, which is nearer the center line 25 than a predetermined threshold, or when the vehicle runs at a position, which is nearer the road shoulder 27 than a predetermined threshold, the support information generating element 23 determines that it is necessary to execute the driving support.

In step S3, a type of the tactile sensibility is selected among predetermined items according to the content of the determination that it is necessary to execute the driving support. Then, the support information generating element 23 inputs the control signal into the tactile sensibility notification element 24, which is mounted in the boss element 4.

The steering wheel tactile sensibility notification controller providing the tactile sensibility notification element controls the stepping motor to turn right or left by a predetermined rotation angle when the driving signal is input into the stepping motor in the boss element 4. Then, the sprocket 10 is rotated to the right or left via the planetary gear system. Thus, the ball chain 6 is displaced by a predetermined distance in a predetermined direction.

Thus, although the front side outer exterior portion 2a, the wheel element core bar 8 and the fixed backside outer exterior portion 2b2 are not displaced, only the movable backside outer exterior portion 2b1 is displaced to the right or left direction by the distance corresponding to the slit G1, G2 so that the rotation displacement of the movable backside outer exterior portion 2b1 is generated. The rotation force is applied to the muscle and/or bone of the driver who holds the steering wheel 1, so that the tactile sensibility of the driver is irritated so as to prompt the driver to turn the steering wheel 1 to a certain direction.

In the present embodiment, not only Pacini corpuscle as the haptic sense receptor of the finger or the like is irritated, but also the muscle and/or bone is moved similar to a massage machine so that the tactile sensibility is irritated. Thus, the support information for supporting the driver to drive the vehicle is noticed to the driver. Thus, even if the hand of the driver is injured, and the hand is wrapped with a bandage, or even if the driver wears a globe, the information providing device appropriately transmits the support information to the driver.

Thus, the outer exterior portion of the wheel element 2 other than the wheel element core bar 8 is divided into the backside outer exterior portion 2b and the front side outer exterior portion 2a. The front side outer exterior portion 2a is integrated with the wheel element core bar 8 so that it is necessary to transmit the rotation force and the load for maintaining the current state of the steering wheel 1 to the steering shaft via the wheel element core bar 8.

The backside outer exterior portion 2b has flexibility, compared with the front side outer exterior portion 2a. Further, the backside outer exterior portion 2b has the corrugated surface having multiple bumps so that the driver easily grips the steering wheel 1 and easily operates the steering wheel 1. Thus, the backside outer exterior portion 2b is suitably used for an actuator of the tactile sensibility notification. Accordingly, since a part of the backside outer exterior portion 2b as an actuator is slidable with respect to the front side outer exterior portion 2a, the tactile sensibility notification for suggesting the rotation direction of the steering wheel 1 is performed on the finger of the driver.

In the present embodiment, the front side outer exterior portion 2a, the fixed backside outer exterior portion 2b2 and the wheel element core bar 8 form a base of the wheel element 2. The movable backside outer exterior portion 2b1 forms a movable portion, which is movable with respect to the base.

The belt 6 and the sprocket 10 form a driving element. The belt 6 is engaged with the movable backside outer exterior portion 2b1 so that the belt 6 pulls the movable backside outer exterior portion 2b1. The sprocket 10 as a rotation body drives the belt 6.

The front side outer exterior portion 2a and the fixed backside outer exterior portion 2b2 form the outer exterior portion of the base. The movable backside outer exterior portion 2b1 forms the outer exterior portion of the movable portion. The wheel element core bar 8 forms a core bar of the base.

Second Embodiment

Figure 9:
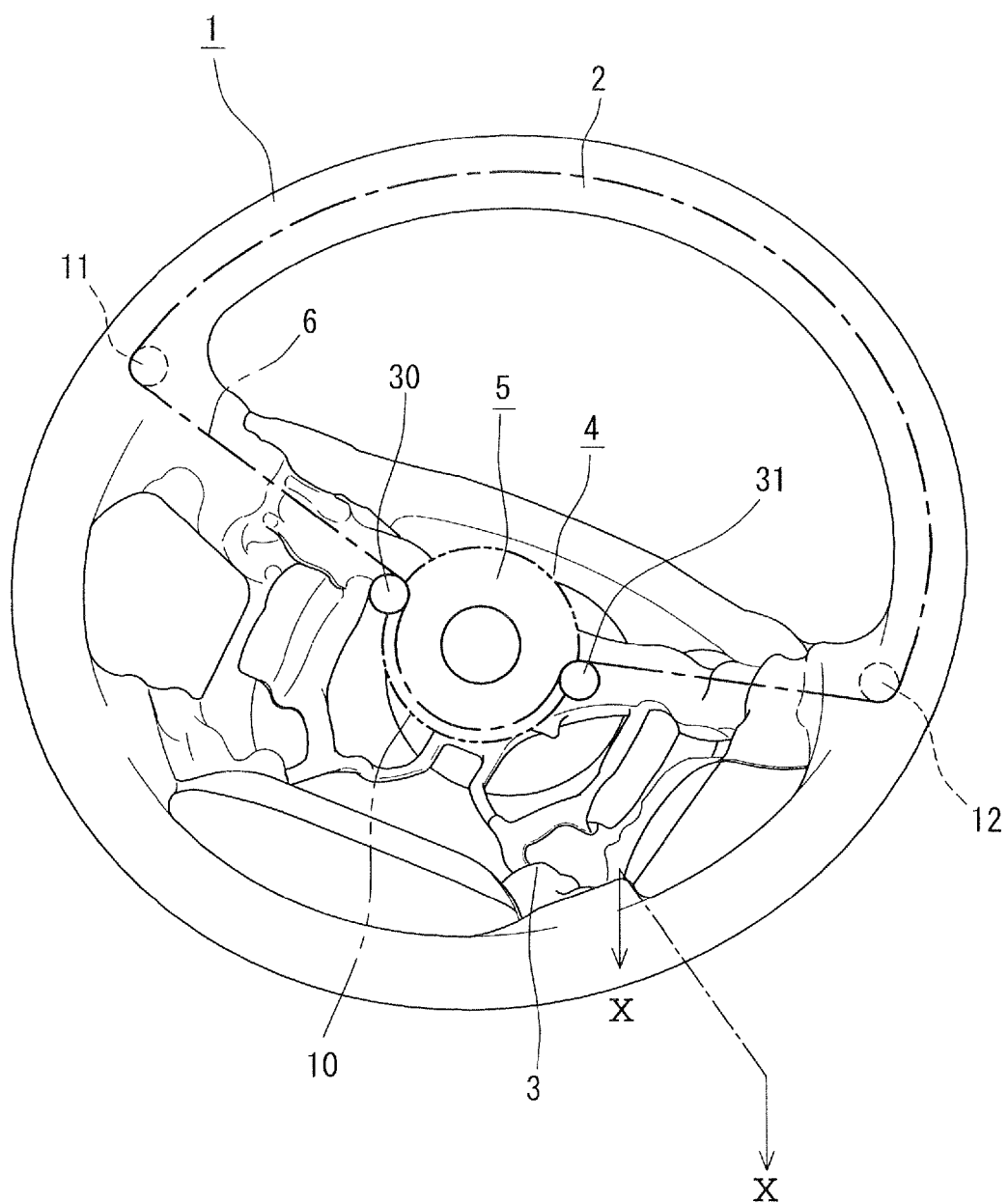
FIG. 9 is a diagram showing an inner structure of a steering wheel together with an information providing device according to a second embodiment.

FIG. 9 shows an inner structure of the steering wheel 1 in an information providing device according to a second embodiment. In FIG. 9, the mounting position of the tactile sensibility notification element and the steering wheel structure are the same as in FIG. 1.

In FIG. 9, an air bag device mounted in the steering wheel 1, a rid having a pad shape for covering the air bag device, and a part of the outer exterior portion of a spoke are not shown in FIG. 9.

In the present embodiment, the installation range of the ball chain 6 is smaller than that in FIG. 1. Further, in addition to the fixed pulleys 11, 12, two pulleys 30, 31 as a roller on the driving element side guides the ball chain 6. Thus, the information providing device includes four fixed pulleys 11, 12, 30, 31.

Figure 10:
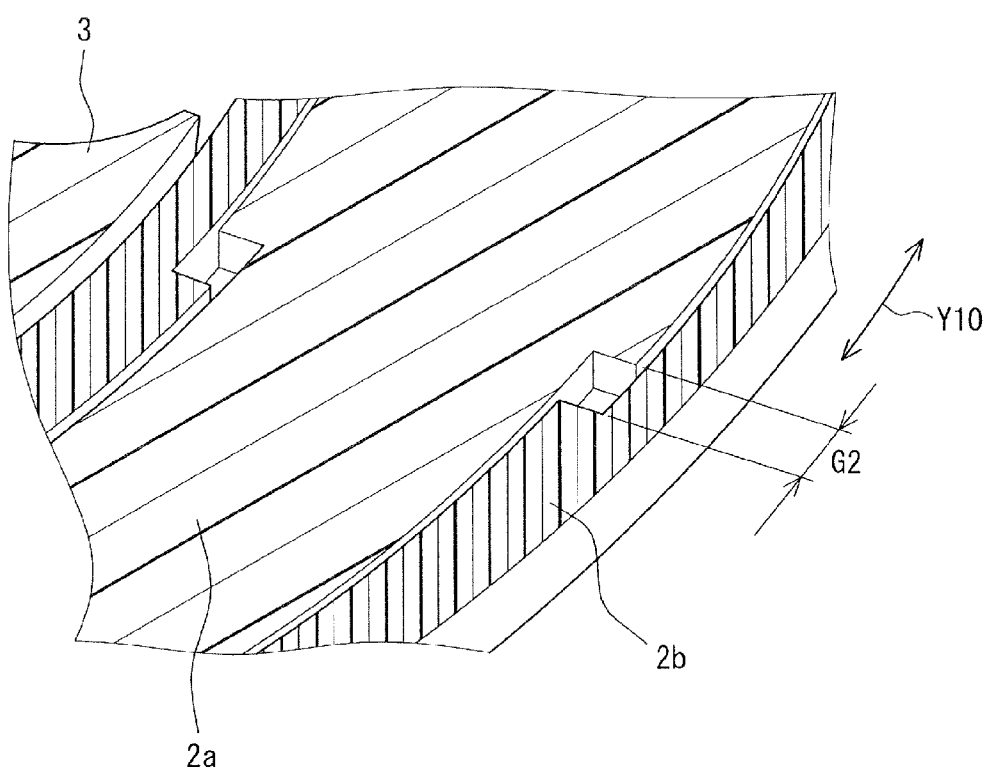
FIG. 10 is a diagram showing a cross sectional view of a part of the steering wheel taken along line X-X in FIG. 9.

FIG. 10 shows a cross section of the wheel element 2 taken along line X-X in FIG. 9. A part of the urethane resin in the front side outer exterior portion 2a is engaged with the concavity of the urethane resin in the backside outer exterior portion 2b.

A slit G2 is formed so as to make the backside outer exterior portion 2b slidable in the direction Y10 with respect to the front side outer exterior portion 2a. Thus, the backside outer exterior portion 2b slides by the distance corresponding to the slit G2 when the backside outer exterior portion 2b is pulled by the ball chain 6. Thus, the tactile sensibility of the driver is irritated.

In the present embodiment, the ball chain 6 is connected to the backside outer exterior portion 2b of the wheel element 2. At least a part of the backside outer exterior portion 2b is movable relative to the front side outer exterior portion 2a and a wheel element core bar (not shown).

Thus, similar to the first embodiment, the front side outer exterior portion 2a, the wheel element core bar and the other part of the backside outer exterior portion 2b are integrally rotated when the driver turns the steering wheel 1 so that the rotation is transmitted to the steering shaft. The part of the backside outer exterior portion 2b slides with respect to the front side outer exterior portion 2a according to the support information of the driving support device so that the rotation displacement of the part of the backside outer exterior portion 2b is generated. The backside outer exterior portion 2b has the corrugated surface having multiple bumps, each of which contacts the finger of the palm of the driver when the driver grips the steering wheel 1. Thus, the direction to turn the steering wheel 1 is informed to the driver.

Third Embodiment

Figure 11:
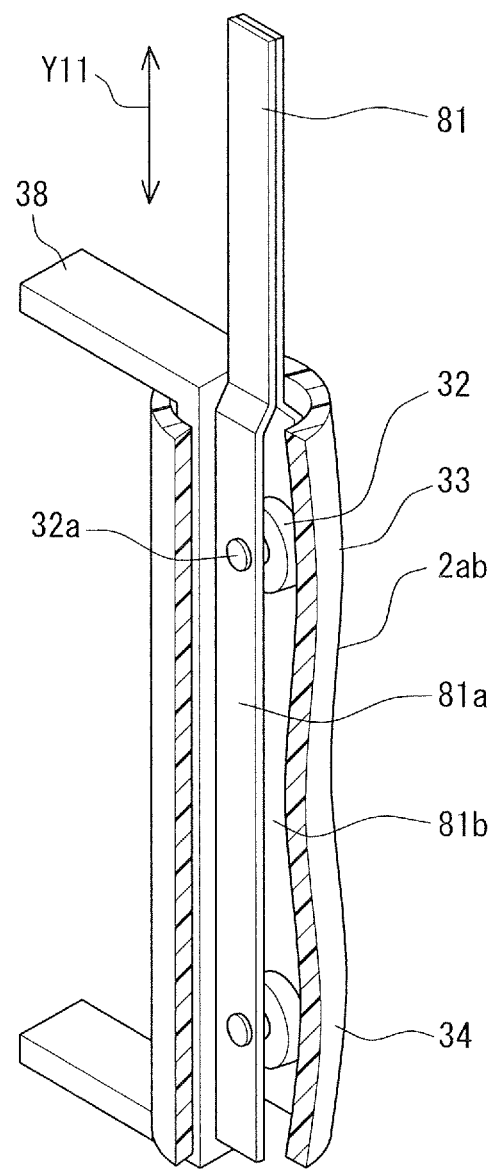
FIG. 11 is a diagram showing an inner structure of a steering wheel according to a third embodiment.

FIG. 11 shows the inside of the outer exterior portion 2ab, which is gripped by hand of the driver. FIG. 11 corresponds to FIG. 2. In FIG. 11, the metallic cylinder shaft is shown as a straight shaft. Practically, the metallic cylinder shaft has a ring shape.

In FIG. 11, the outer exterior portion 2ab has a cylindrical shape and is made of urethane resin or polypropylene. The backside and the front side of the outer exterior portion 2ab are integrated. A movable wheel element core bar 81 is arranged in the outer exterior portion 2ab having a tube shape. The movable wheel element core bar 81 in FIG. 11 is shown as a straight bar. Practically, the movable wheel element core bar 81 has a ring shape. A spoke core shaft 38 is disposed in a spoke element.

A part of the movable wheel element core bar 81 is divided into bifurcated portions 81a, 81b. A pin 32a and a roller 32 are formed in the bifurcated portions 81a, 81b. The roller 32 forms a moving element, which rotatable around the pin 32a. The movable wheel element core bar 81 is connected to a ball chain (not shown) so that the movable wheel element core bar 81 is slidable in the direction Y11. Even when the movable wheel element core bar 81 is displaced, the spoke core shaft 38 and the steering shaft coupled with the spoke core shaft 38 are not displaced. Here, the spoke core shaft 38 is arranged in the spoke element and the wheel element, which is gripped by the driver. In FIG. 11, only a part of the spoke core shaft 38 is shown.

The roller 32 is displaced in the outer exterior portion 2ab, and the outer periphery of the roller 32 rolls along with the outer exterior portion 2ab so that the roller 32 is displaced. Thus, the corrugated portion 33, 34 arranged on the surface of the outer exterior portion 2ab is displaced. Since the roller 32 rolls and moves, the roller 32 can be displaced with a comparatively small force.

The steering shaft is coupled with the spoke core shaft 38 and the fixed wheel core bar (not shown) so that they forms a fixed portion. The movable wheel element core bar 81 is relatively movable in a predetermined range with respect to the fixed portion so that the movable wheel element core bar 81 forms a movable portion.

The movable wheel element core bar 81 and the fixed wheel core bar form a wheel core having a ring shape. Slits corresponding to the slits G1, G2 are formed between the movable wheel element core bar 81 and the fixed wheel core bar.

When the movable wheel element core bar 81 is moved, the roller 32 is displaced in the outer exterior portion 2ab having flexibility. The surface of the roller 32 contacts the outer exterior portion 2ab, so that the corrugated portion 33, 34 on the outer periphery of the outer exterior portion 2ab is moved.

Thus, the corrugated portion 33, 34 is moved in conjunction with the displacement of the movable wheel element core bar 81 by the distance corresponding to the slit in the direction Y11.

Even when the corrugated portion 33, 34 is move, the steering shaft is not displaced. When the corrugated portion 33, 34 is move, the muscle and/or bone of the finger of the driver is moved so that the tactile sensibility of the driver is irritated. It is preferable that the information providing device includes two or more corrugated portions 33, 34 and multiple rollers 32, as shown in FIG. 11.

Thus, in the present embodiment, the roller 32 forms the corrugated portion 33, 34 so that the roller 32 provides a corrugated portion generating element. The roller 32 is disposed in the urethane resin of the outer exterior portion 2ab. The urethane resin is stretchable with respect to the roller 32. When the roller 32 as the corrugated portion generating element is moved, the position of the corrugated portion 33, 34 of the wheel element 2 is displaced. Here, the dimensions of the corrugated portion 33, 34, the distance between adjacent two corrugated portions 33, 34, the displacement speed of the roller 32, and the displacement direction of the roller 32 may be set to any.

Thus, when the contents of the tactile sensibility notification are limited to the information about the rotation direction of the steering wheel, and the tactile sensibility is irritated so that interpretation of the irritation is comparatively clear, the support information is notified to the driver accurately and easily.

In the third embodiment, the spoke core shaft 38 forms the base of the wheel element 2. The movable wheel element core bar 81 forms the movable portion movable relatively with respect to the base of the wheel element 2. The belt 6 and the sprocket 10 form the driving portion. The belt 6 is connected to the movable wheel element core bar 81. The belt 6 pulls the movable wheel element core bar 81 so that the movable wheel element core bar 81 is displaced. The belt 6 is driven by the sprocket 10. The outer exterior portion 2ab having a tube shape forms the flexible element covering the movable portion.

Fourth Embodiment

Figure 13A:
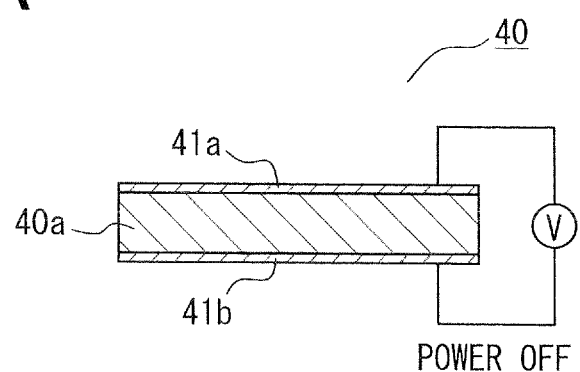
FIGS. 13A and 13B are diagrams showing an operation mode of a piezoelectric device made of polymer molecule according to a fourth embodiment.
Figure 13B:
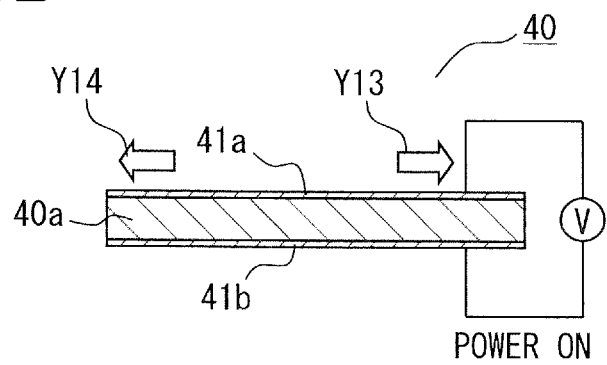
Figure 14A:
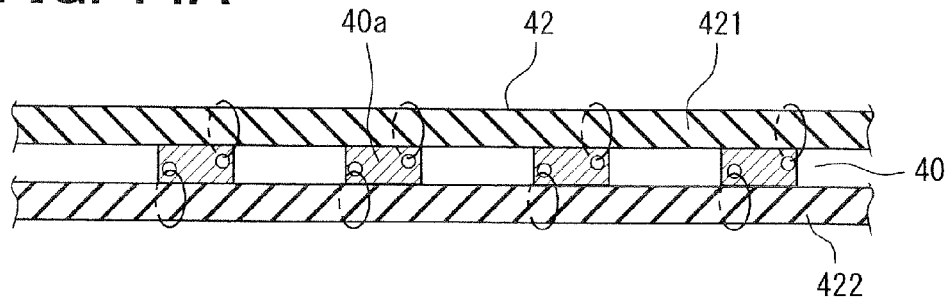
FIGS. 14A and 14B are diagrams showing an operation mode for rotating a steering cover clockwise with the piezoelectric device according to the fourth embodiment.
Figure 14B:
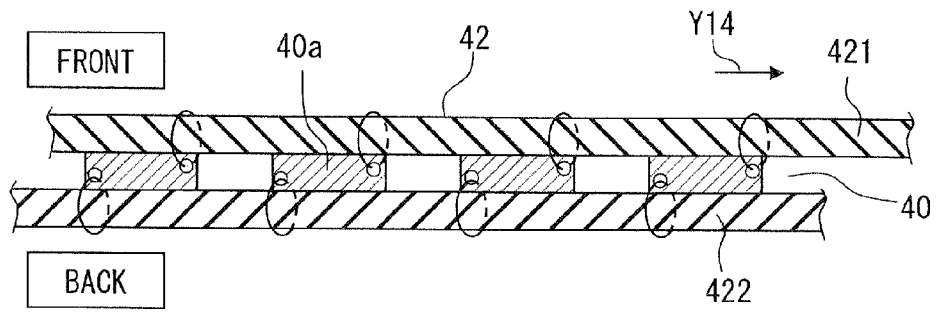
Figure 15A:
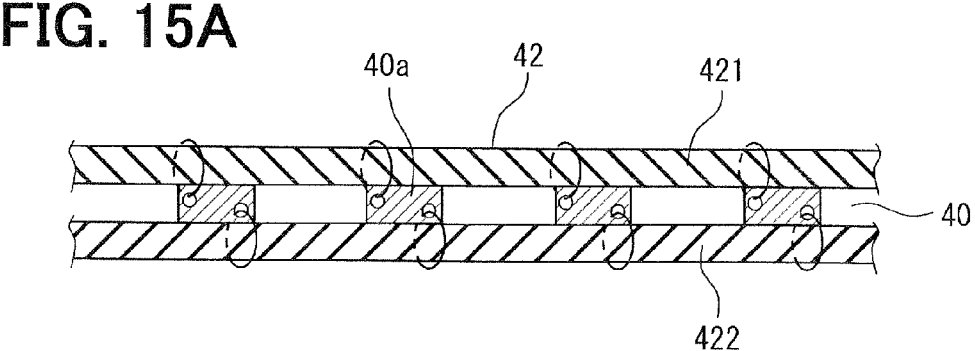
FIGS. 15A and 15B are diagrams showing an operation mode for rotating a steering cover counter-clockwise with the piezoelectric device according to the fourth embodiment.
Figure 15B:
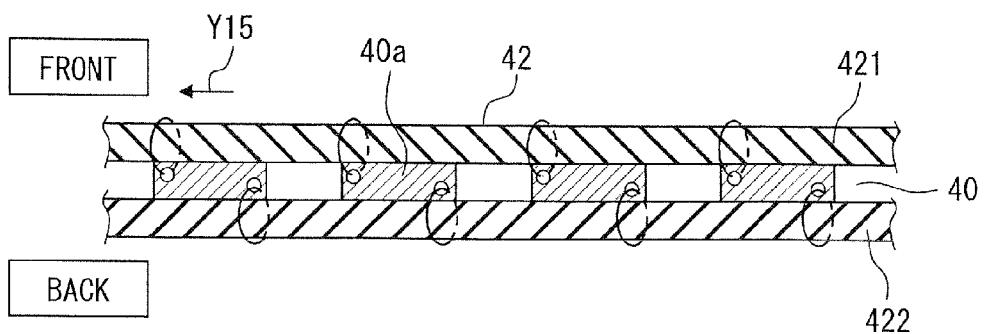

Next, an information providing device according to a fourth embodiment includes a piezoelectric device as a polymer molecule actuator. FIGS. 13A and 13B show an operation mode of a soft actuator 40 as the piezoelectric device made of polymer molecule according to the fourth embodiment. FIGS. 14A and 14B show an operation mode for rotating a steering cover 42 clockwise with the soft actuator 40. In FIGS. 14A and 14B, multiple soft actuators 40 are aligned in a driver side. FIGS. 15A and 15B show an operation mode for rotating the steering cover 42 counter-clockwise with the soft actuator 40. In FIGS. 15A and 15B, multiple soft actuators 40 are aligned in a traveling direction side.

Figure 16:
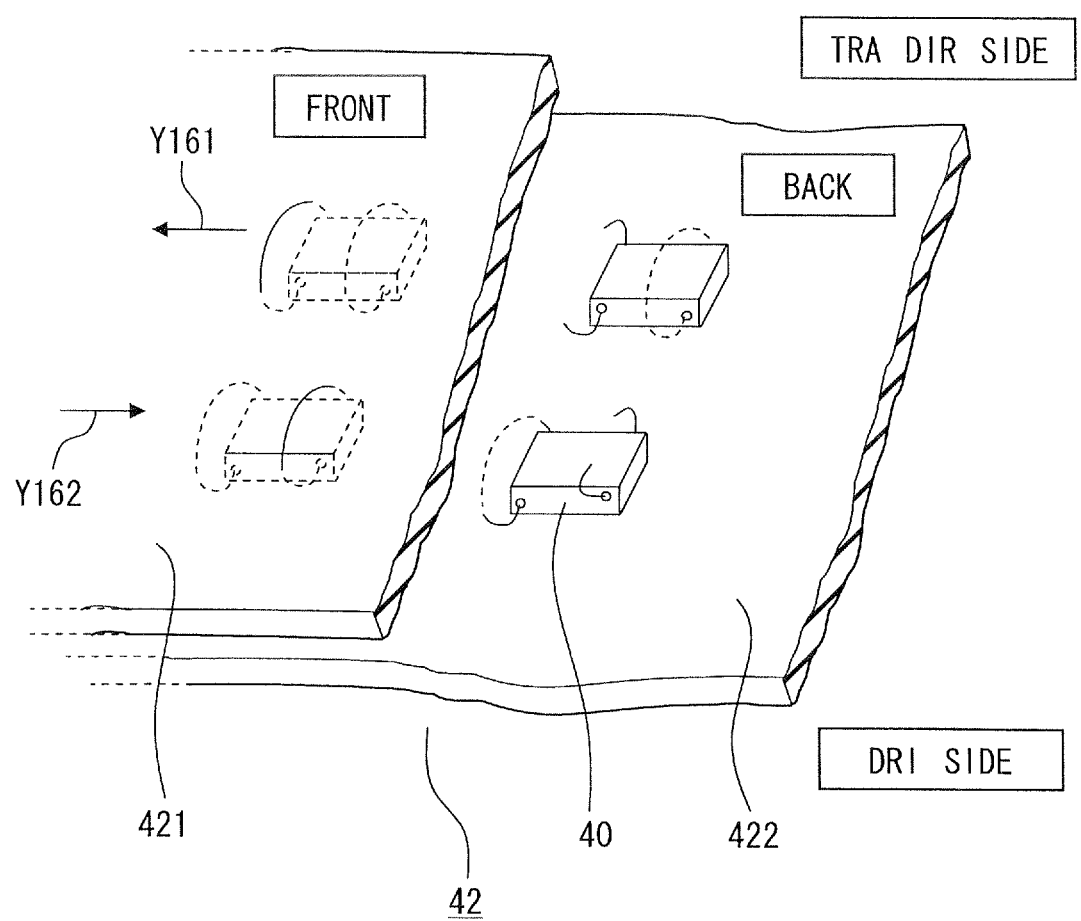
FIG. 16 is a diagram showing a development view of the steering cover seeing from an arrow Y17 in FIG. 17.
Figure 17:
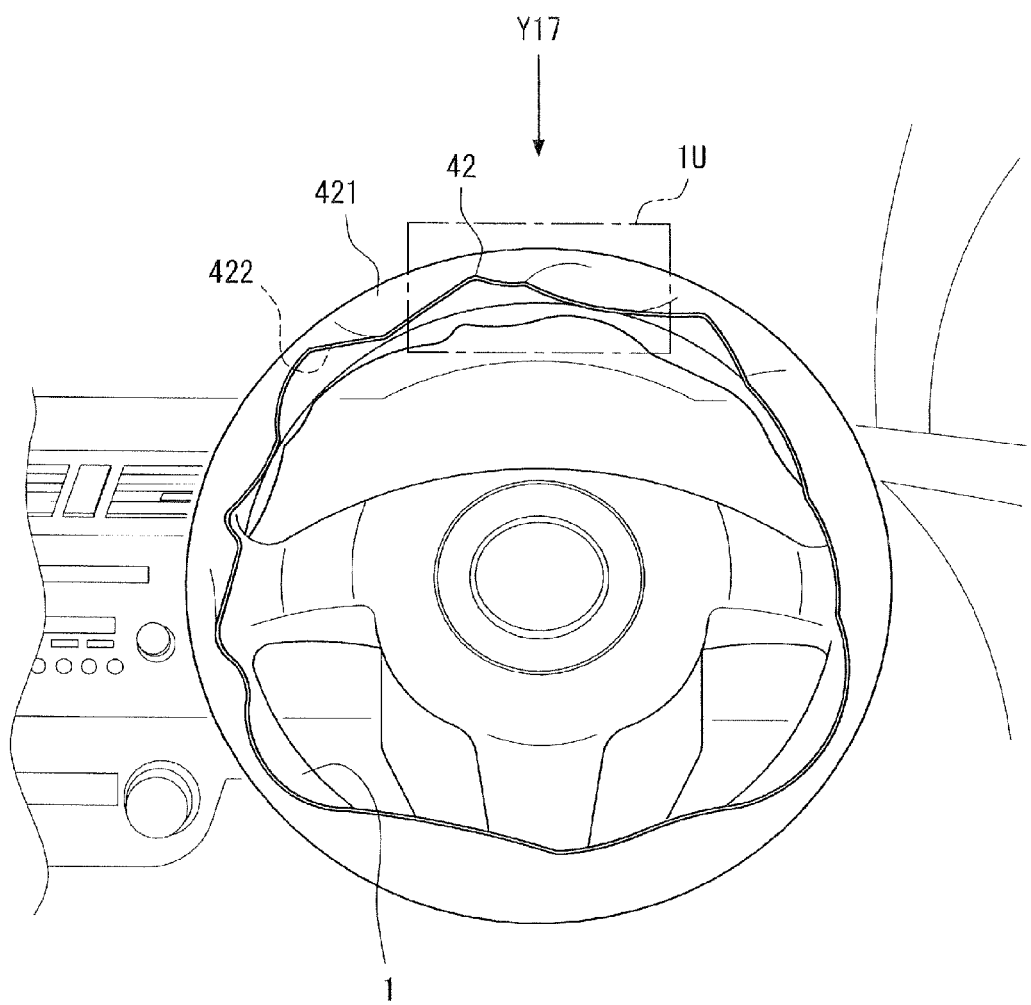
FIG. 17 is a diagram showing a perspective view of the steering wheel with the steering cover winded thereon according to the fourth embodiment.
Figure 18:
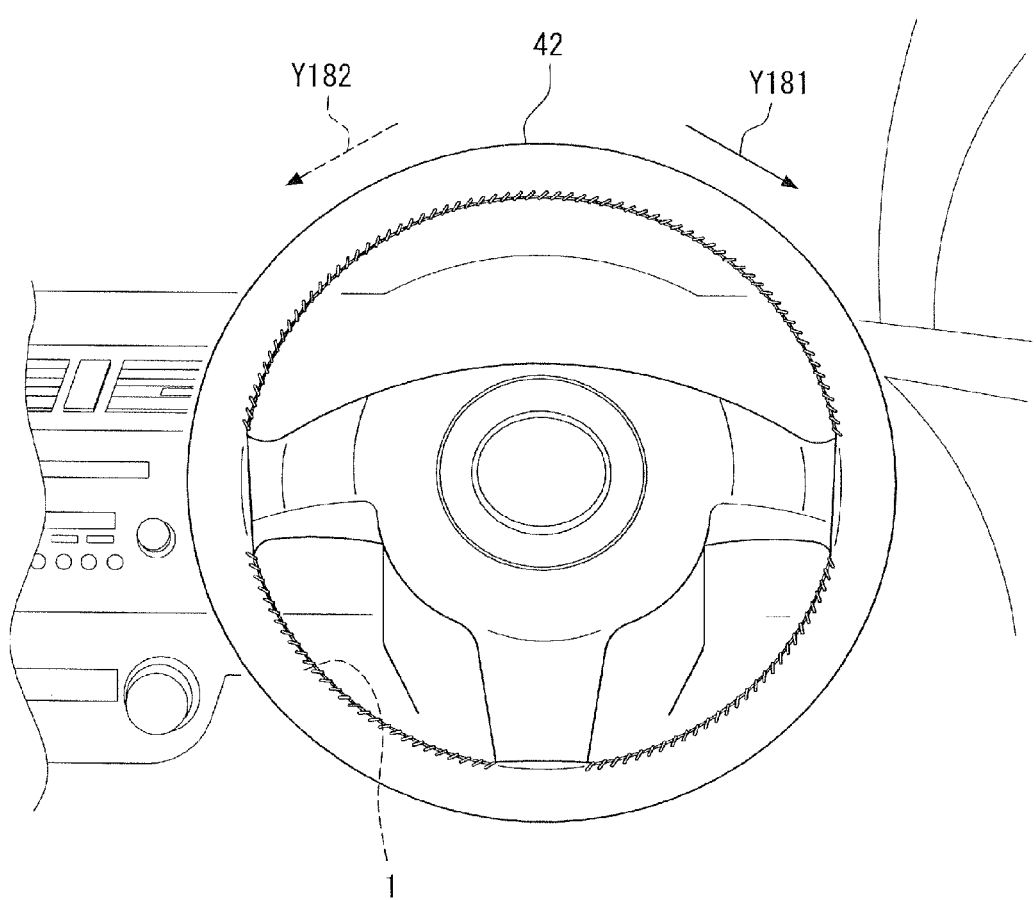
FIG. 18 is a diagram showing a perspective view of the steering wheel with the steering cover winded and sewed thereon.

FIG. 16 shows a development view of the steering cover 42 seeing from an arrow Y17 in FIG. 17. The soft actuators 40 in the traveling direction side are arranged on an upper side of the sheets 421, 422, and the soft actuators 40 in the driver side are arranged on a lower side of the sheets 421, 422. Accordingly, the soft actuators 40 are aligned in two lines, one being on the traveling direction side, and the other being on the driver side. FIG. 17 shows a perspective view of the steering wheel 1 with the steering cover 42 winded thereon. Accordingly, the soft actuators 40 arranged in the traveling direction side are aligned on a backside of the steering wheel 1, and the soft actuators 40 arranged in the driver side are aligned on a front side of the steering wheel 1. FIG. 18 shows a perspective view of the steering wheel 1 with the steering cover 42 winded and sewed thereon.

An artificial muscle is a piezoelectric type artificial muscle, a shape-memory alloy type artificial muscle, an electrostatic type artificial muscle, a pressurized air type artificial muscle or the like. The artificial muscle is made of polymer molecule such as synthetic resin. The artificial muscle is defined as the soft actuator. In the present embodiment, the soft actuator 40 as the driving portion is used.

FIGS. 13A and 13B show operating principle of the soft actuator 40 including a dielectric element made of polymer molecule. When strong electric field is applied to dielectric elastomer, the dielectric elastomer contracts in the direction of the electric field, and the dielectric elastomer expands in a direction perpendicular to the electric field direction so that a stress is generated.

A dielectric element 40a made of polymer molecule is sandwiched between two electrode plates 41a, 41b. When a voltage is applied to the dielectric element 40a, the dielectric element 40a is charged, and an attractive force is generated between the electrode plates 41a, 41b. Thus, the dielectric element 40a is pressed and squashed, and the dielectric element 40a expands in a direction parallel to the plates 41a, 41b. Multiple soft actuators 40 including the dielectric element 40a are arranged at predetermined intervals between two sheets made of synthetic resin or rubber having flexibility. Further, each actuator 40 is sewed and fixed to the sheets.

Although not shown in FIGS. 14A to 15B, with using a flexible printed circuit board, the electrode plates 41a, 41b in the actuator 40 are wired. As shown in FIGS. 14A and 14B, one end of the dielectric element 40a of the soft actuator 40 on an advance side of the actuator 40 (i.e., a right side of the drawing in FIGS. 14A and 14B) is sewed and fixed to the front side sheet 421 of the steering cover 42. The other end of the dielectric element 40a of the soft actuator 40 on a fixed side of the actuator 40 (i.e., a left side of the drawing in FIGS. 14A and 14B) is sewed and fixed to the back side sheet 422.

When the voltage is not applied to the actuator 40, the state of the actuator 40 is shown in FIGS. 13A and 14A. When the voltage is applied to the actuator 40, as shown in FIGS. 13B and 14B, the dielectric element 40a expands in the direction Y13 in FIGS. 13 and Y14 in FIG. 14 as a facial direction. Thus, the front side sheet 421 is slipped with respect to the back side sheet 422 of the steering cover 42.

Since the back side sheet 422 is fixed to the steering wheel 1, the front side sheet 421 is moved in the direction Y14 in FIG. 14B. In FIGS. 15A and 15B, when the voltage is applied to the actuator 40, the dielectric element 40a expands in the direction Y15 as a facial direction (i.e., the left direction). Thus, as shown in FIGS. 15B, the front side sheet 421 is slipped with respect to the back side sheet 422. Since the back side sheet 422 is fixed to the steering wheel 1, the front side sheet 421 is moved in the direction Y15 in FIG. 15B.

FIG. 16 shows the part of the steering cover 42, which is attached to an upper portion 1U of the steering wheel 1. As shown in FIG. 16, multiple actuators 40 are arranged between the back side sheet 422 and the front side sheet 421. The steering cover 42 includes the back side sheet 422 and the front side sheet 421. The steering cover 42 is winded around the steering wheel 1 in a ring shape manner.

In FIG. 16, the actuators 40 on the traveling direction side of the steering wheel 1 (on the upper row in the drawing in FIG. 16) move the front side sheet 421 in the direction Y161 so that the front side sheet 421 is rotated counter-clockwise. The actuators 40 on the driver side of the steering wheel 1 (on the lower row in the drawing in FIG. 16) move the front side sheet 421 in the direction Y162 so that the front side sheet 421 is rotated clockwise.

FIG. 17 shows the steering wheel 1 with the steering cover 42 winded on the wheel 1. The adhesion is applied to the rear surface of the back side sheet 422 so that the back side sheet 422 is easily attached to the steering wheel 1.

FIG. 18 shows the steering wheel 1 with the steering cover 42, which is sewed and fixed to the steering wheel 1. Specifically, the inner periphery of the steering cover 42 is sewed so that the attachment of the steering cover 42 is completed. In FIG. 18, the tactile sensibility notification element is arranged at least a part of the steering wheel 1, which is gripped by the driver. The front side sheet 421 as a front cover 421 of the steering cover 42 is displaced in the circumferential direction such as the direction Y181, Y182 according to the support information.

Next, the function of the information providing device according to the fourth embodiment will be explained with reference to FIGS. 5 to 8B. The support information generating element 23 of the information providing device 20 in FIG. 5 inputs the driving signal into the electrode plates of the actuator 40, which includes the dielectric element 40a of the steering cover 42. The actuator 40 forms the tactile sensibility notification element 24.

As shown in FIG. 7A, when the vehicle runs near the center line 25, and therefore, it is necessary to turn the steering wheel 1 in the counter-clockwise direction so that the vehicle runs a center of the traffic lane. In this case, the voltage is applied to the actuators 40 in the traveling direction side in FIG. 15, and the voltage is not applied to the actuators 40 in the driver side in FIG. 14. Here, the actuators 40 in the traveling direction side in FIG. 15 moves the front side sheet 421 in the counter-clockwise direction, and the actuators 40 in the driver side in FIG. 14 moves the front side sheet 421 in the clockwise direction.

Thus, a part of the front side sheet 421 on the traveling direction side slips by a predetermined amount in the counter-clockwise direction, and the other part of the front side sheet 421 on the driver side does not slip. Thus, the steering cover 42 made of elastomer twists. The rotation force of the steering cover 42 in the counter-clockwise direction is transmitted to the inner face of the mid finger of the driver. The information for requesting to turn the steering wheel 1 in the counter-clockwise direction is notified.

Next, as shown in FIG. 8A, when the vehicle runs near the road shoulder 27, and therefore, it is necessary to turn the steering wheel 1 in the clockwise direction so that the vehicle runs a center of the traffic lane. In this case, the voltage is applied to the actuators 40 in the driver side in FIG. 14, and the voltage is not applied to the actuators 40 in the traveling direction side in FIG. 15.

Thus, a part of the front side sheet 421 on the driver side slips by a predetermined amount in the clockwise direction, and the other part of the front side sheet 421 on the traveling direction side does not slip. Thus, the steering cover 42 made of elastomer twists. The rotation force of the steering cover 42 in the clockwise direction is transmitted to the inner face of the thumb of the driver. The information for requesting to turn the steering wheel 1 in the clockwise direction is notified.

Figure 19A:
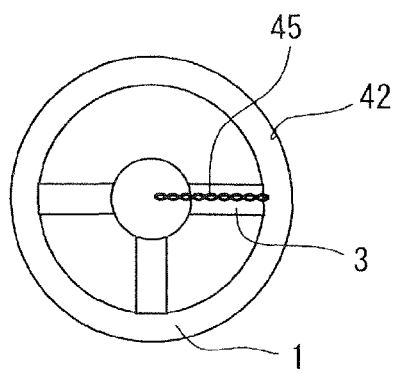
FIGS. 19A to 19C are diagrams showing various structures of energizing the information providing device via a wire.
Figure 19B:
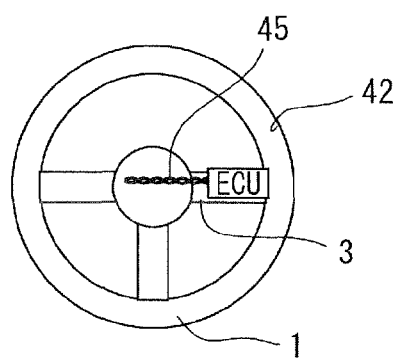
Figure 19C:
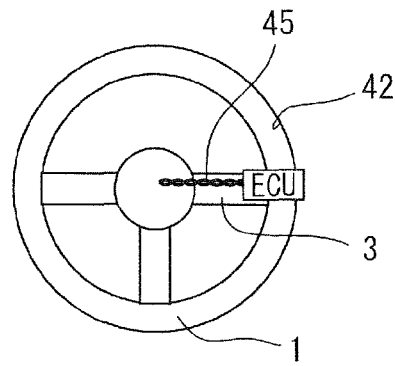

Next, the energizing method for the actuators 40 and the like arranged in the steering wheel 1 will be explained as follows. FIGS. 19A to 19C show various structures of energizing the information providing device via a wire.

In the present embodiment, the information providing device is a simple actuator 40. The actuator 40 functions according to an instruction signal from a ECU as the support information generating element 23 in FIG. 5, which is mounted on an outside of the steering wheel 1. Here, the ECU is a controller including an electronic control unit.

In this case, as shown in FIG. 19A, a power source line 45 for transmitting information about an on/off state of the actuator is formed of a spiral cable arranged from the actuator in the steering wheel 1 to an lower portion of a switch for turning on and off a horn along with the spoke 3. The switch is arranged at the center of the steering wheel 1. In this case, the actuator of the information providing device functions according to an instruction signal from a controller (i.e., ECU), which is separated from the actuator.

Thus, in the present embodiment, the vehicle condition detecting element for detecting the vehicle condition according to the sensor information is arranged in an instrumental panel. Based on the vehicle condition, the support information generating element generates the support information, which is available for the driving support of the driver. The information providing device includes the support information generating element as a controller, i.e., a ECU, and the steering cover 42 as the tactile sensibility notification element for notifying the support information to the driver of the vehicle. The steering cover 42 is arranged on the steering wheel 1, which is operated by the driver.

The steering wheel 1 includes the wheel element, which is directly operated by the driver. The wheel element includes the base element and the front side sheet 421 of the steering cover 42, which functions as the movable portion. The front side sheet 421 is displaceable with respect to the base element relatively. Based on the support information, the soft actuator 40 as the driving unit drives the front side sheet 421.

The soft actuator 40 is made of dielectric material including polymer molecule. The front side sheet 421 of the steering cover 42 functioning as the movable portion and the soft actuator 40 functioning as the driving unit form the tactile sensibility notification element. According to the movement of the movable portion, the tactile sensibility notification element notifies the direction of the steering wheel 1 to be operated to the driver.

(Modifications)

In the first embodiment, the front side outer exterior portion 2a is fixed to the wheel element core bar 8. The backside outer exterior portion 2b having the corrugated surface having multiple bumps generates the rotation displacement with respect to the front side outer exterior portion 2a. Alternatively, the backside outer exterior portion 2b may be fixed to the wheel element core bar 8, and the front side outer exterior portion 2a may generates the rotation displacement with respect to the backside outer exterior portion 2b.

In the first embodiment, the ball chain 6 in FIG. 1 is arranged in a range of 300 degrees in the wheel element 2. The ball chain 6 may be formed of a wire or a belt for transmitting the movement in the circumferential direction to the movable portion of the wheel element.

Alternatively, only a part of the belt, which engages the sprocket 10, may be connected to a rotation body including the sprocket 10 and a gear, similar to the ball chain 6 and the timing belt. The other part of the belt may be formed of a wire and/or a belt without multiple balls and multiple protrusions for connecting to the rotation body.

The backside outer exterior portion 2b is slidable with respect to the front side outer exterior portion 2a. In order to reduce sliding resistance of a sliding portion, the backside and the front side outer exterior portion 2a, 2b may include a two-layered structure so that a resin part of the front side outer exterior portion 2a contacts and slides on a resin part of the backside side outer exterior portion 2b. When the resin parts contacts with each other, the sliding resistance is minimized. Alternatively, the sliding surfaces of the backside and the front side outer exterior portions 2a, 2b may be covered with a metal coat and the like so that the sliding surfaces of the backside and the front side outer exterior portions 2a, 2b are easily slidable.

In the first embodiment, a part of the backside side outer exterior portion 2b in the range of 300 degrees between the fixed pulleys 11, 12 is slidable with respect to the front side outer exterior portion 2a. The other part of the backside side outer exterior portion 2b functions as the fixed portion so that the other part of the backside side outer exterior portion 2b is connected to the front side outer exterior portion 2a.

Specifically, in the first embodiment, only the part of the backside side outer exterior portion 2b is movable with using the belt 6. Alternatively, a whole of the backside side outer exterior portion 2b in the range of 360 degrees may be slidable with respect to the front side outer exterior portion 2a. In this case, the sliding amount and the sliding direction may be determined by the number of rotations and the rotation direction of the motor for transmitting the driving force to the rotation body formed by the sprocket and the gear, which drive the belt 6.

In the first embodiment, the driving support cases when the driver drives the vehicle near the center line or the road shoulder are described. The information providing device may provide the information in other cases. For example, the in-vehicle devices may include a proximity detecting sensor for detecting proximity of an obstacle, which may collide on the vehicle. The proximity detecting sensor includes a radar for emitting a millimeter wave so that the proximity detecting sensor can detect a relative speed between the obstacle and the vehicle and/or the distance between obstacle and the vehicle. In this case, when the proximity detecting sensor detects the proximity of the obstacle on a right front side of the vehicle, the information providing device may generate the tactile sensibility notification to facilitate the driver to turn the steering wheel 1 to the left.

Alternatively, when the destination is arranged on the left side in association with the navigation device, the information providing device may execute the tactile sensibility notification to facilitate the driver to change a traffic lane from a current lane to a left side lane. Alternatively, in order to avoid the collision when the driver parks the vehicle at a parking lot, the information providing device may guide show the steering direction of the steering wheel 1 to the driver.

In the first embodiment, the ball chain 6 is moved by the sprocket 10. Alternatively, a rack having a circular shape may be moved by a pinion so that the belt reciprocatory moves. Here, both ends of the rack are connected to the belt, and the pinion is driven by the rotation shaft of a geared motor.

In the first embodiment, the device includes the stepping motor having the hollow portion and the planetary gear system. Alternatively, the device may include a direct current motor capable of forward rotating and backward rotating, and a worm wheel having a hollow portion, which is engaged with a worm gear so that the worm wheel is capable of forward rotating and backward rotating. The worm gear is arranged on an output shaft of the direct current motor. The sprocket may be engaged with the outer periphery of the worm wheel.

In the first embodiment, the front side outer exterior portion 2a, the backside outer exterior portion 2b, and outer exterior portion 2ab are made of resin. Alternatively, the front side outer exterior portion 2a, the backside outer exterior portion 2b, and outer exterior portion 2ab may be made of other materials. Further, in the first embodiment, the backside outer exterior portion 2b includes the fixed backside outer exterior portion 2b2 on the lower side of the steering wheel 1 between the slits G1, G2 and the movable backside outer exterior portion 2b1 on the upper side of the steering wheel 1 between the slits G1, G2. A pair of slits G1, G2 are formed between the fixed backside outer exterior portion 2b2 and the movable backside outer exterior portion 2b1. The movable backside outer exterior portion 2b1 is movable by the distance corresponding to the slits G1, G2. Alternatively, the movable backside outer exterior portion 2b1 may be divided into multiple parts, and the fixed backside outer exterior portion 2b2 may be divided into multiple parts. Each part of the fixed backside outer exterior portion 2b2 is sandwiched between two adjacent parts of the movable backside outer exterior portion 2b1 via a pair of slits.

In the above embodiments, the device includes two or four fixed pulleys 11, 12, 30, 31. Alternatively, the device may include five or more pulleys so that the belt 6 is smoothly bent.

In FIGS. 7A to 8B, the vehicle condition detecting element detects the driving position of the vehicle with respect to the road, which is a detection object facing the vehicle. The support information generating element generates the support information for notifying the direction of the steering wheel 1 to be operated according to the driving position of the vehicle. Alternatively, the detection object may be other vehicle including a motorcycle running ahead of the vehicle, and an obstacle and/or a pedestrian disposed in front of the vehicle.

Specifically, the vehicle condition detecting element detects the driving position of the vehicle with respect to the other vehicle, other motorcycle, the obstacle and the pedestrian. The support information generating element generates the support information for notifying the direction of the steering wheel 1 to be operated according to the driving position of the vehicle.

Figure 12:
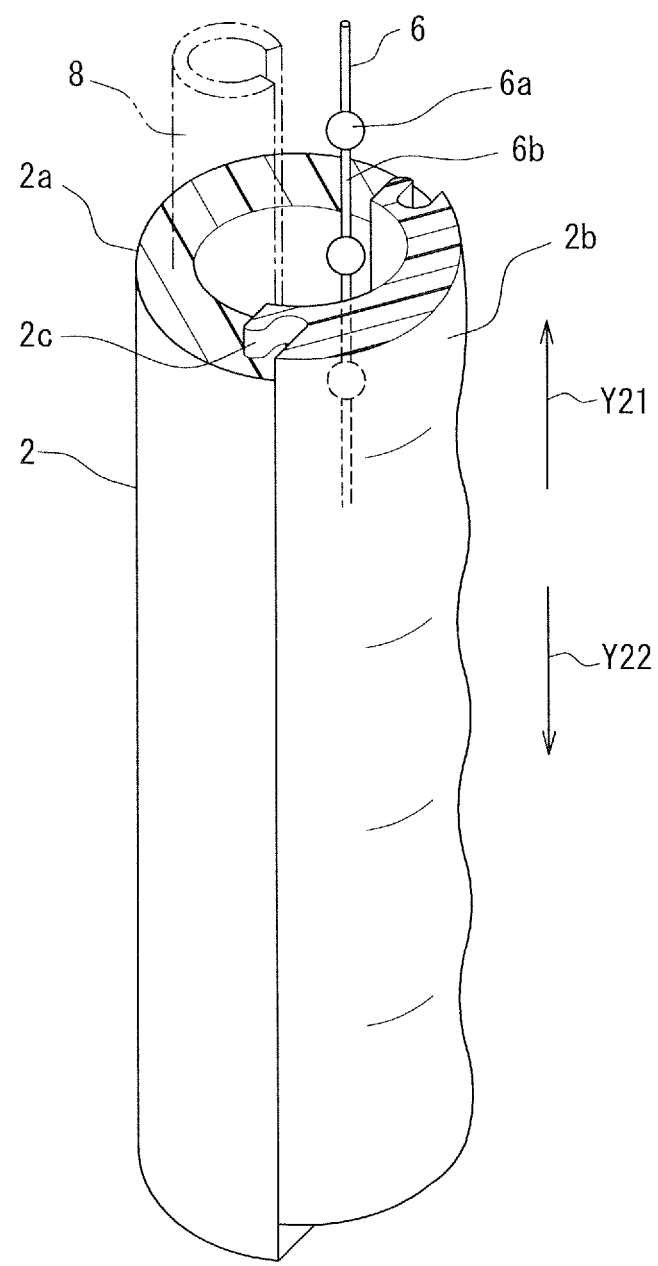
FIG. 12 is a diagram showing a part of a steering wheel according to a modification of the third embodiment.

In FIG. 2, the wheel element core bar 8 has a circular cross section. Alternatively, the wheel element core bar 8 may have a C-shaped cross section, as shown in FIG. 12. A conventional steering wheel 1 has such a wheel element core bar 8.

In step S3 of FIG. 6, the type of the tactile sensibility is selected among the predetermined items according to the content of the determination that it is necessary to execute the driving support. Then, the support information generating element 23 inputs the control signal into the tactile sensibility notification element 24, which is mounted in the boss element 4.

Then, the driving signal is input into the stepping motor of the boss element 4 so that the stepping motor rotates by the predetermined rotation amount in the right or left.

Alternatively, before the stepping motor rotates by the predetermined rotation amount in the right or left, the stepping motor rotates back and forth in small motions so that the small motion of the stepping motor provides to notify the driver of the warning. After the information providing device notifies the driver of the warning, the stepping motor rotates by the predetermined amount in the right or left so that the device notifies the information about the direction of the steering wheel 1 to be operated. Thus, the ball chain 6 is displaced in the predetermined direction by the predetermined amount.

Before the device notifies the driver of the steering direction, the device provides the small motions so that the steering wheel vibrates in the right and left similar to a vibrator. Thus, the device raises the caution. Thus, the driver easily finds the motion of the steering wheel 1 representing the support information.

In the above embodiments, the driving unit includes the electric motor or the piezoelectric element. Alternatively, the driving unit may include an actuator such as a linear motor having small dimensions and small thickness.

A whole of the soft actuator including the piezoelectric element is accommodated in the steering cover. Alternatively, the piezoelectric element may be arranged in the spoke element, and the front side sheet as the movable portion may be pulled by a driving cable or a driving wire.

In the fourth embodiment, the device is energized by the wire shown in FIG. 19A. Alternatively, the device may be energized in other energization manner with using a wire. FIG. 19B, a controller as a ECU of the information providing device is energized by a wire formed of a spiral cable arranged under a horn via the spoke element 3.

Here, when the controller of the information providing device and the input sensor are integrated, i.e., when the input and output signals are completely closed, the power source line of the ECU is simply energized with using the spiral cable 45.

Next, as shown in FIG. 19C, although the information providing device and the controller are integrated, the control signal is input into the device from an external device via a CAN (controlled area network) or the like. In this case, with using the spiral cable 45, the power source line and a signal line are arranged. The signal line functions as a communication line.

Figure 20A:
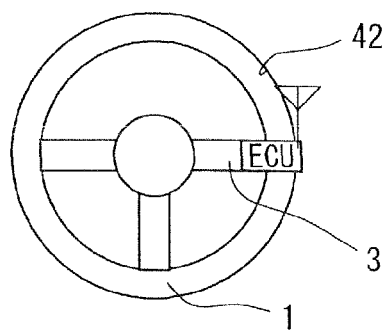
FIGS. 20A to 20C are diagrams showing various structures of energizing the information providing device wireless.
Figure 20B:
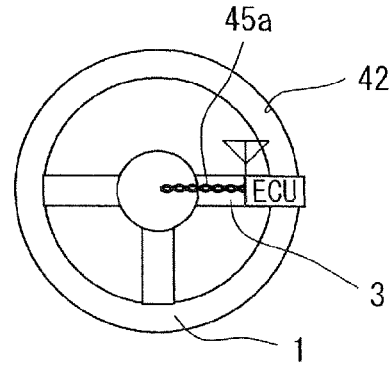
Figure 20C:
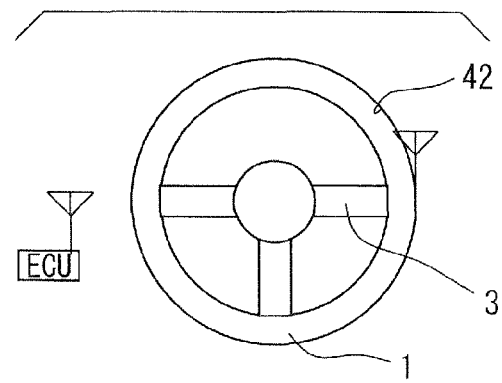

Then, FIGS. 20A to 20C show various structures of energizing the information providing device wireless. FIG. 20A shows a wireless type energization system with an antenna. A surface mounting structure of the controller of the information providing device and the antenna are mounted on the spoke element 3 including the horn so that the device is energized without a wire.

FIG. 20B shows a case where only the signal is transmitted to the device wirelessly. The electric power is supplied to the device via a wire as the spiral cable 45*a*. FIG. 20C shows a case where the control and the energization are performed wirelessly. Here, the controller of the information providing device is not arranged in the steering wheel 1. The smart actuator integrated with a control unit for receiving a control signal from the ECU wirelessly and for operating the actuator. The smart actuator is also energized without a wire.

The above disclosure has the following aspects.

According to an example aspect of the present disclosure, an information providing device for a vehicle includes: a vehicle condition detector for detecting a vehicle condition based on information from an in-vehicle sensor; a support information generating element for generating support information, which provides to support a driver of the vehicle, based on the vehicle condition; and a tactile sensibility notification element for notifying the support information to the driver. The tactile sensibility notification element is arranged in a steering wheel of the vehicle. The steering wheel includes a wheel element, which is gripped by the driver. The wheel element includes a base, a movable portion and at least a part of a driving unit. The movable portion is relatively movable with respect to the base. The driving unit drives the movable portion according to the support information. The movable portion and the driving unit provide the tactile sensibility notification element. Movement of the movable portion provides notification of the support information.

In the above device, since the movement of the movable portion provides the notification of the support information, muscle and bone of a hand of the driver is irritated so that tactile sensibility is irritated. Thus, the support information is accurately transmitted to the driver, and therefore, the driver interprets the information accurately even when the sensibility of each driver is varied.

Alternatively, the support information generating element may determine a steering direction of the steering wheel to be operated, and the support information is information about the steering direction.

Alternatively, rotation of the base may be transmitted to a steering shaft when the driver turns the base of the steering wheel so that the vehicle changes a driving direction, and relative movement of the movable portion is not transmitted to the steering shaft so that the vehicle does not change the driving direction. Thus, the relative movement of the movable portion does not affect on a steering operation of the driver.

Alternatively, the tactile sensibility notification element may be arranged at least in a range between two o'clock and four o'clock and a range between eight o'clock and ten o'clock.

Alternatively, the base may include: a core bar arranged in the wheel element; and a base outer exterior portion coupled with the core bar and covering an outer surface of the wheel element. The movable portion includes a movable outer exterior portion, which is relatively movable with respect to the base outer exterior portion, and covers another outer surface of the wheel element. The driving unit drives the movable outer exterior portion with respect to the base outer exterior portion and the core bar. In this case, since the movable outer exterior portion, which is gripped by the driver, is displaced, the tactile sensibility is irritated so as to transmit the support information.

Further, the movable outer exterior portion may have a corrugated surface having a plurality of bumps. In this case, the tactile sensibility, i.e., the muscle and the bone of the driver is effectively irritated.

Further, the movable outer exterior portion and the base outer exterior portion may be separated from each other by a pair of slits, and the driving unit displaces the movable outer exterior portion by a distance corresponding to the slits in the steering direction of the steering wheel to be operated. In this case, the displacement amount is limited to the distance corresponding to the slits. Thus, if the displacement amount is large, the displacement of the movable portion may affect on the steering operation of the driver. However, since the displacement amount is limited, the displacement does not affect on the steering operation.

Further, the driving unit may include a belt and a rotator. The belt pulls the movable outer exterior portion according to the support information, and the rotator drives the belt. In this case, the belt is accommodated in the wheel element so that the dimensions of the driving unit are minimized.

Alternatively, the steering wheel may further include a boss element, which is arranged at a center of the wheel element. The base includes a base core bar, which is coupled with the boss element. The movable portion includes a movable core bar and an outer cover. The movable core bar is movable with respect to the base core bar. The outer cover covers the movable core bar, and is made of flexible material. The movable core bar contacts the outer cover so that a corrugated portion is formed on the outer cover. The driving unit displaces the movable core bar relatively with respect to the base core bar so that a position of the corrugated portion is displaced. When the position of the corrugated portion is displaced, the displacement of the corrugated portion transmits the muscle and bone of the driver. Thus, the tactile sensibility, i.e., the muscle and the bone of the driver is effectively irritated.

Further, the movable core bar may include a roller, which rotates in the outer cover, and an outer periphery of the roller is displaced along with an inner surface of the outer cover so that the position of the corrugated portion is displaced. In this case, friction resistance between the corrugated portion and the roller is reduced, and therefore, it is not necessary to apply a large force to the roller.

Further, the driving unit may include a belt and a rotator. The belt pulls the movable core bar according to the support information, and the rotator drives the belt. In this case, the belt having small dimensions transmits the driving force to the movable core bar. Thus, the movable core bar is displaced in a comparatively small space of the wheel element.

Alternatively, the vehicle condition detector may detect a driving position of the vehicle with respect to an obstacle, and the support information generating element generates the support information according to the driving position of the vehicle. In this case, based on the support information, the movable portion of the wheel element is relatively displaced with respect to the base. Thus, the steering direction to be operated is notified to the driver via the tactile sensibility of the driver.

Alternatively, the movable portion may be displaced back and forth in small motions before the tactile sensibility notification element notifies the support information to the driver. In this case, the driver can easily find the irritation of the tactile sensibility.

Alternatively, the wheel element may further include a steering wheel cover for covering the wheel element. The base, the movable portion and the at least a part of the driving unit are arranged in the steering wheel cover, and the movement of the movable portion generates movement of a surface of the steering wheel cover so that the tactile sensibility notification element notifies the steering direction of the steering wheel to be operated. In this case, the steering wheel cover provides the tactile sensibility notification element.

Further, the steering wheel cover may include a front side sheet and a back side sheet. The front side sheet is stacked over the back side sheet. The front side sheet is disposed on an outside of the steering wheel cover. The at least the part of the driving unit is arranged between the front side sheet and the back side sheet. The back side sheet provides a part of the base, and the front side sheet provides a part of the movable portion. The movement of the front side sheet transmits the muscle and bone of the driver so that tactile sensibility is irritated.

Further, the driving unit may be a polymer molecule actuator including a piezoelectric element, which displaces the front side sheet relatively with respect to the back side sheet. In this case, since the actuator has small dimensions, the driving unit is easily accommodated in the steering wheel cover.

Alternatively, the driving unit may be energized via a cable, which is arranged in a spoke element of the steering wheel. The arrangement of the cable does not affect on the steering operation of the driver.

Alternatively, the driving unit may be energized wirelessly via an antenna, which is arranged on the steering wheel. Since there is no wiring, the arrangement of the driving unit does not affect on the steering operation of the driver.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An information providing device for a vehicle comprising:
   a vehicle condition detector for detecting a vehicle condition based on information from an in-vehicle sensor;
   a support information generating element for generating support information, which provides to support a driver of the vehicle, based on the vehicle condition; and
   a tactile sensibility notification element for notifying the support information to the driver,
   wherein the tactile sensibility notification element is arranged in a steering wheel of the vehicle,
   wherein the steering wheel includes a wheel element, which is gripped by the driver,
   wherein the wheel element includes a base, a movable portion and at least a part of a driving unit,
   wherein the movable portion is relatively movable with respect to the base,
   wherein the driving unit drives the movable portion according to the support information,
   wherein the movable portion and the driving unit provide the tactile sensibility notification element, and
   wherein movement of the movable portion provides notification of the support information.

2. The information providing device according to claim 1, wherein the support information generating element determines a steering direction of the steering wheel to be operated, and
   wherein the support information is information about the steering direction.

3. The information providing device according to claim 1, wherein rotation of the base is transmitted to a steering shaft when the driver turns the base of the steering wheel so that the vehicle changes a driving direction, and
   wherein relative movement of the movable portion is not transmitted to the steering shaft so that the vehicle does not change the driving direction.

4. The information providing device according to claim 1, wherein the tactile sensibility notification element is arranged at least in a range between two o'clock and four o'clock and a range between eight o'clock and ten o'clock.

5. The information providing device according to claim 2, wherein the base includes: a core bar arranged in the wheel element; and a base outer exterior portion coupled with the core bar and covering an outer surface of the wheel element,
   wherein the movable portion includes a movable outer exterior portion, which is relatively movable with respect to the base outer exterior portion, and covers another outer surface of the wheel element, and
   wherein the driving unit drives the movable outer exterior portion with respect to the base outer exterior portion and the core bar.

6. The information providing device according to claim 5, wherein the movable outer exterior portion has a corrugated surface having a plurality of bumps.

7. The information providing device according to claim 5, wherein the movable outer exterior portion and the base outer exterior portion are separated from each other by a pair of slits, and
   wherein the driving unit displaces the movable outer exterior portion by a distance corresponding to the slits in the steering direction of the steering wheel to be operated.

8. The information providing device according to claim 7, wherein the driving unit includes a belt and a rotator,
   wherein the belt pulls the movable outer exterior portion according to the support information, and
   wherein the rotator drives the belt.

9. The information providing device according to claim 2, wherein the steering wheel further includes a boss element, which is arranged at a center of the wheel element,
   wherein the base includes a base core bar, which is coupled with the boss element,
   wherein the movable portion includes a movable core bar and an outer cover,
   wherein the movable core bar is movable with respect to the base core bar,
   wherein the outer cover covers the movable core bar, and is made of flexible material,
   wherein the movable core bar contacts the outer cover so that a corrugated portion is formed on the outer cover, and
   wherein the driving unit displaces the movable core bar relatively with respect to the base core bar so that a position of the corrugated portion is displaced.

10. The information providing device according to claim 9, wherein the movable core bar includes a roller, which rotates in the outer cover, and wherein an outer periphery of the roller is displaced along with an inner surface of the outer cover so that the position of the corrugated portion is displaced.

11. The information providing device according to claim 9, wherein the driving unit includes a belt and a rotator, wherein the belt pulls the movable core bar according to the support information, and wherein the rotator drives the belt.

12. The information providing device according to claim 2, wherein the vehicle condition detector detects a driving position of the vehicle with respect to an obstacle, and wherein the support information generating element generates the support information according to the driving position of the vehicle.

13. The information providing device according to claim 1, wherein the movable portion is displaced back and forth in small motions before the tactile sensibility notification element notifies the support information to the driver.

14. The information providing device according to claim 2, wherein the wheel element further includes a steering wheel cover for covering the wheel element, wherein the base, the movable portion and the at least a part of the driving unit are arranged in the steering wheel cover, and wherein the movement of the movable portion generates movement of a surface of the steering wheel cover so that the tactile sensibility notification element notifies the steering direction of the steering wheel to be operated.

15. The information providing device according to claim 14, wherein the steering wheel cover includes a front side sheet and a back side sheet, wherein the front side sheet is stacked over the back side sheet, wherein the front side sheet is disposed on an outside of the steering wheel cover, wherein the at least the part of the driving unit is arranged between the front side sheet and the back side sheet, wherein the back side sheet provides a part of the base, and wherein the front side sheet provides a part of the movable portion.

16. The information providing device according to claim 15, wherein the driving unit is a polymer molecule actuator including a piezoelectric element, which displaces the front side sheet relatively with respect to the back side sheet.

17. The information providing device according to claim 1, wherein the driving unit is energized via a cable, which is arranged in a spoke element of the steering wheel.

18. The information providing device according to claim 1, wherein the driving unit is energized wirelessly via an antenna, which is arranged on the steering wheel.

* * * * *